(12) United States Patent
Tamiya

(10) Patent No.: US 11,086,679 B2
(45) Date of Patent: Aug. 10, 2021

(54) DETERMINE WHETHER TO ACCELERATE A PROCESS OF A PROGRAM BASED ON CHARACTERISTIC VALUES ASSOCIATED WITH STRONGLY CONNECTED GRAPHS

(71) Applicant: FUJITSU LIMITED, Kawasaki (JP)

(72) Inventor: Yutaka Tamiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 16/127,300

(22) Filed: Sep. 11, 2018

(65) Prior Publication Data

US 2019/0079800 A1    Mar. 14, 2019

(30) Foreign Application Priority Data

Sep. 13, 2017  (JP) .............................. JP2017-176198

(51) Int. Cl.
*G06F 9/50* (2006.01)
*G06F 17/18* (2006.01)
*G06F 11/34* (2006.01)

(52) U.S. Cl.
CPC .......... *G06F 9/5011* (2013.01); *G06F 9/5044* (2013.01); *G06F 11/3419* (2013.01); *G06F 17/18* (2013.01); *G06F 11/3466* (2013.01)

(58) Field of Classification Search
CPC .. G06F 11/3419; G06F 11/3466; G06F 17/18; G06F 9/5011; G06F 9/5044
See application file for complete search history.

(56) References Cited

U.S. PATENT DOCUMENTS

| | | | | |
|---|---|---|---|---|
| 7,861,226 B1 * | 12/2010 | Episkopos | .......... | G06F 11/3696 717/124 |
| 2012/0144376 A1 * | 6/2012 | Van Eijndhoven | ..... | G06F 8/456 717/146 |
| 2012/0154412 A1 * | 6/2012 | Harney | ................. | G06F 9/5011 345/522 |
| 2014/0297405 A1 | 10/2014 | Fine | | |
| 2019/0050248 A1 * | 2/2019 | Ooh Ira | ................ | G06F 9/5044 |

FOREIGN PATENT DOCUMENTS

| | | |
|---|---|---|
| JP | 2012-133778 | 7/2012 |
| JP | 2014-191828 | 10/2014 |

OTHER PUBLICATIONS

Bourdoncle, Francois, "Efficient chaotic iteration strategies with widenings", Formal Methods in Programming and their Applications, Springer, Berlin, Heidelberg, 1993 (14 pages).
Allen, Frances E., "Control Flow Analysis", ACM SIGPLAN Notices, vol. 5, No. 7, pp. 1-19, ACM, 1970 (19 pages).
JPOA—Office Action of Japanese Patent Application No. 2017-176198 dated Jun. 15, 2021 with English Machine translation.

* cited by examiner

*Primary Examiner* — Jorge A Chu Joy-Davila
(74) *Attorney, Agent, or Firm* — Fujitsu Patent Center

(57) ABSTRACT

An apparatus identifies each of one or more strongly connected graphs included in a control flow graph of a program, and calculates a characteristic value indicating a characteristic of a first process indicated by the identified strongly connected graph, based on profile information indicating a characteristic of a second process indicated by each of one or more nodes included in the control flow graph. The apparatus determines, based on the calculated characteristic value of the first process and a requirement set for an accelerator, whether or not the first process is executable by the accelerator.

12 Claims, 17 Drawing Sheets

FIG. 4

```
      void func (int a, int b, int* s)
      {
L1 : *s = 0;
L2 : int x = 0;
L3 : while ( x <= a ) {
L4 :   int y = 0;
L5 :   while ( y <= x ) {
L6 :     if ( b == 0 )
L7 :       *s += y;
L8 :     else
L9 :       *s += ( y + 1 ) * ( y + 2 );
L10:     y ++ ;
L11:   }
L12:   x  ++ ;
L13: }
L14: *s /= a;
      }
```

| TIME (SECONDS) | EVENT THAT HAS OCCURRED | COMMAND ADDRESS | BRANCH Taken OR Not Taken |
|---|---|---|---|
| 0.1 | EXECUTION OPERATION | L2 | — |
| 0.2 | TIMER | L7 | — |
| ... | | | |
| 0.5 | LLC MISS | L7 | — |
| 0.6 | BRANCH COMMAND | L6 | Taken |
| 0.7 | EXECUTION OPERATION | L1 | — |
| 1.0 | TIMER | L6 | — |

FIG. 9

PROFILE INFORMATION 900

| BASIC BLOCK | ROW NUMBERS | SCSs | NUMBER OF OPERATIONS (Ops) | NUMBER OF MILLION OPERATIONS TO BE EXECUTED PER UNIT OF TIME (M Ops/s) | MEMORY ACCESS AMOUNT (M bytes/s) | CPU UTILIZATION (%) | BRANCHING PROBABILITY % (CORRESPONDING TO Taken) |
|---|---|---|---|---|---|---|---|
| 1 | L1, L2 | SCS1 | 2 | 20 | 40 | 4 | — |
| 2 | L3 | SCS2 | 1 | 50 | 0 | 4 | 80.0 |
| 3 | L4 | SCS2 | 1 | 40 | 0 | 4 | — |
| 4 | L5 | SCS2&4 | 1 | 150 | 0 | 12 | 66.7 |
| 5 | L6 | SCS2&4 | 1 | 160 | 0 | 12 | 66.7 |
| 6 | L7 | SCS2&4 | 1 | 100 | 400 | 16 | — |
| 7 | L9 | SCS2&4 | 4 | 200 | 200 | 23 | — |
| 8 | L10 | SCS2&4 | 1 | 140 | 0 | 12 | — |
| 9 | L12 | SCS2 | 1 | 60 | 0 | 3 | — |
| 10 | L14 | SCS10 | 8 | 80 | 80 | 10 | — |

| BASIC BLOCK | NUMBER OF OPERATIONS (Ops) | PROFILE INFORMATION BRANCHING PROBABILITY (% CORRESPONDING TO Taken) |
|---|---|---|
| 4 | 1 | 66.7 |
| 5 | 1 | 66.7 |
| 6 | 1 | — |
| 7 | 4 | — |
| 8 | 1 | — |

| SCS | BASIC BLOCK | NUMBER OF SELF-OPERATIONS (Ops) | NUMBER OF MILLION OPERATIONS TO BE EXECUTED PER UNIT OF TIME (M Ops/s) | MEMORY ACCESS AMOUNT (M bytes/s) | CPU UTILIZATION (%) | FREQUENCY OF EXECUTION (M TIMES/s) | NUMBER OF OPERATIONS (Ops) | OPERATIONAL INTENSITY (Ops/byte) |
|---|---|---|---|---|---|---|---|---|
| SCS1 | 1 | 2 | 20 | 40 | 4 | 10 | 2 | 0.5 |
| SCS2 | 2-9 | 3 | 900 | 600 | 86 | 50 | 18 | 1.5 |
| SCS4 | 4-8 | 5 | 750 | 600 | 75 | 150 | 5 | 1.25 |
| SCS10 | 10 | 8 | 80 | 80 | 10 | 10 | 8 | 1.0 |

| TIME (SECONDS) | EVENT THAT HAS OCCURRED | COMMAND ADDRESS | LBR RECORD | BRANCH Taken OR Not Taken |
|---|---|---|---|---|
| 0.1 | FLOATING-POINT OPERATION | L2 | G, –, –, – | – |
| 0.2 | TIMER | L7 | L6, L5, L3, G | – |
| ... | | | | |
| 0.5 | LLC MISS | L6 | L6, L5, L3, G | – |
| 0.6 | BRANCH COMMAND | L6 | L5, L3, H, – | Taken |
| 0.7 | FLOATING-POINT OPERATION | L1 | G, –, –, H | – |
| 1.0 | TIMER | L7 | L6, L5, L3, H | – |

1300

| TIME (SECONDS) | EVENT THAT HAS OCCURRED | COMMAND ADDRESS | LBR RECORD | BRANCH Taken OR Not Taken |
|---|---|---|---|---|
| 0.1 | FLOATING-POINT OPERATION | L2 | G, –, –, – | – |
| 0.2 | TIMER | L7 | L6, L5, L3, G | – |
| ... | | | | |
| 0.5 | NUMBER OF EXECUTION COMMANDS | L6 | L6, L5, L3, G | – |
| 0.6 | BRANCH COMMAND | L6 | L5, L3, H, – | Taken |
| 0.7 | FLOATING-POINT OPERATION | L1 | G, –, –, – | – |
| 1.0 | TIMER | L7 | L6, L5, L3, H | – |

```
GenerateSCS (graph) { //SCS GENERATION FUNCTION USING GRAPH graph AS INPUT
L1 :  setOfSCS = Φ; //INITIALIZE SCS SET TO EMPTY SET
L2 :  setOfSCC = FindSCC(graph); //CALCULATE SCC of graph USING CONVENTIONAL ALGORITHM
L3 :  while (setOfSCC ! = Φ) { //REPEAT While LOOP UNTIL ALL SCCs ARE PROCESSED
L4 :    nextOfSCC = Φ; //INITIALIZE VARIABLE FOR SETTING SCC SET TO BE PROCESSED BY NEXT foreach LOOP
L5 :    foreach (scc ∈ setOfSCC) { //PROCESS SCCs OF SCC SET IN ORDER
L6 :      if (scc ∈ setOfSCS) continue; //SKIP PROCESS RELATED TO PROCESSED scc
L7 :      if (NotSatisfyCPUUsage(scc)) continue; //SKIP PROCESS RELATED TO scc THAT DOES NOT SATISFY PREDETERMINED REQUIREMENT
L8 :      setOfSCS = setOfSCS ∪ {scc}; //ADD scc TO SCS SET
L9 :      foreach (node ∈ NodeOf(scc)) { //REPEATEDLY PROCESS NODES INCLUDED IN scc
L10:        subGraph = scc − {node}; //SET PARTIAL GRAPH OBTAINED BY REMOVING node FROM scc
L11:        nextOfSCC = FindSCC(subGraph) ∪ nextOfSCC; //CALCULATE SCC
L12:      }
L13:    }
L14:    setOfSCC = nextOfSCC; //SET NEXT SCC SET TO CURRENT SCC SET
L15:  }
L16:  return setOfSCS; //RETURN SCS SET AS RESULT
}
```

DETERMINE WHETHER TO ACCELERATE A PROCESS OF A PROGRAM BASED ON CHARACTERISTIC VALUES ASSOCIATED WITH STRONGLY CONNECTED GRAPHS

CROSS-REFERENCE TO RELATED APPLICATION

This application is based upon and claims the benefit of priority of the prior Japanese Patent Application No. 2017-176198, filed on Sep. 13, 2017, the entire contents of which are incorporated herein by reference.

FIELD

The embodiment discussed herein is related to an information processing device, and an information processing method.

BACKGROUND

Traditionally, there is an offloading technique for causing hardware, which is dedicated to a specific process and is, for example, a field-programmable gate array (FPGA), a graphics processing unit (GPU), or the like, to execute one or more of processes to be executed by a central processing unit (CPU), instead of the CPU. The hardware is referred to as accelerator, for example.

As a conventional technique, there is a technique for comparing the performance of an accelerated version of an application able to receive benefit from a hardware accelerator with the performance of a standard version. In addition, for example, there is a technique for determining whether or not a specific function satisfies an accelerator policy and assigning the function to a hardware accelerator if the accelerator policy is satisfied.

Examples of related art are Japanese Laid-open Patent Publication No. 2014-191828 and Japanese Laid-open Patent Publication No. 2012-133778.

SUMMARY

According to an aspect of the invention, an apparatus identifies each of one or more strongly connected graphs included in a control flow graph of a program, and calculates a characteristic value indicating a characteristic of a first process indicated by the identified strongly connected graph, based on profile information indicating a characteristic of a second process indicated by each of one or more nodes included in the control flow graph. The apparatus determines, based on the calculated characteristic value of the first process and a requirement set for an accelerator, whether or not the first process is executable by the accelerator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an example of a source code of a program;

FIG. 8 is a diagram illustrating an example of even information;

FIG. 9 is a diagram illustrating an example of a profile information table;

FIG. 12 is a diagram illustrating an example of the determination of whether or not a process is suitable to be executed by an accelerator;

FIG. 13 is a diagram illustrating another example of the calculation of characteristic values of the process expressed by the SCS;

FIG. 17 is a diagram illustrating an example of a source code defining the SCS identification process.

DESCRIPTION OF EMBODIMENT

In the conventional techniques, it is difficult to determine whether or not any of a series of processes defined in a certain program is suitable to be executed by an accelerator. For example, it is difficult to determine whether or not a time period for the series of processes is reduced when any of the series of processes is executed by the accelerator.

According to an aspect, an object of the embodiment is to provide an information processing device, an information processing method, and an information processing program that may determine whether or not a process is suitable to be executed by an accelerator.

Hereinafter, an embodiment of an information processing device disclosed herein, an information processing method disclosed herein, and an information processing method disclosed herein is described in detail with reference to the accompanying drawings.

Example of Information Processing Method According to Embodiment

Figure 1:
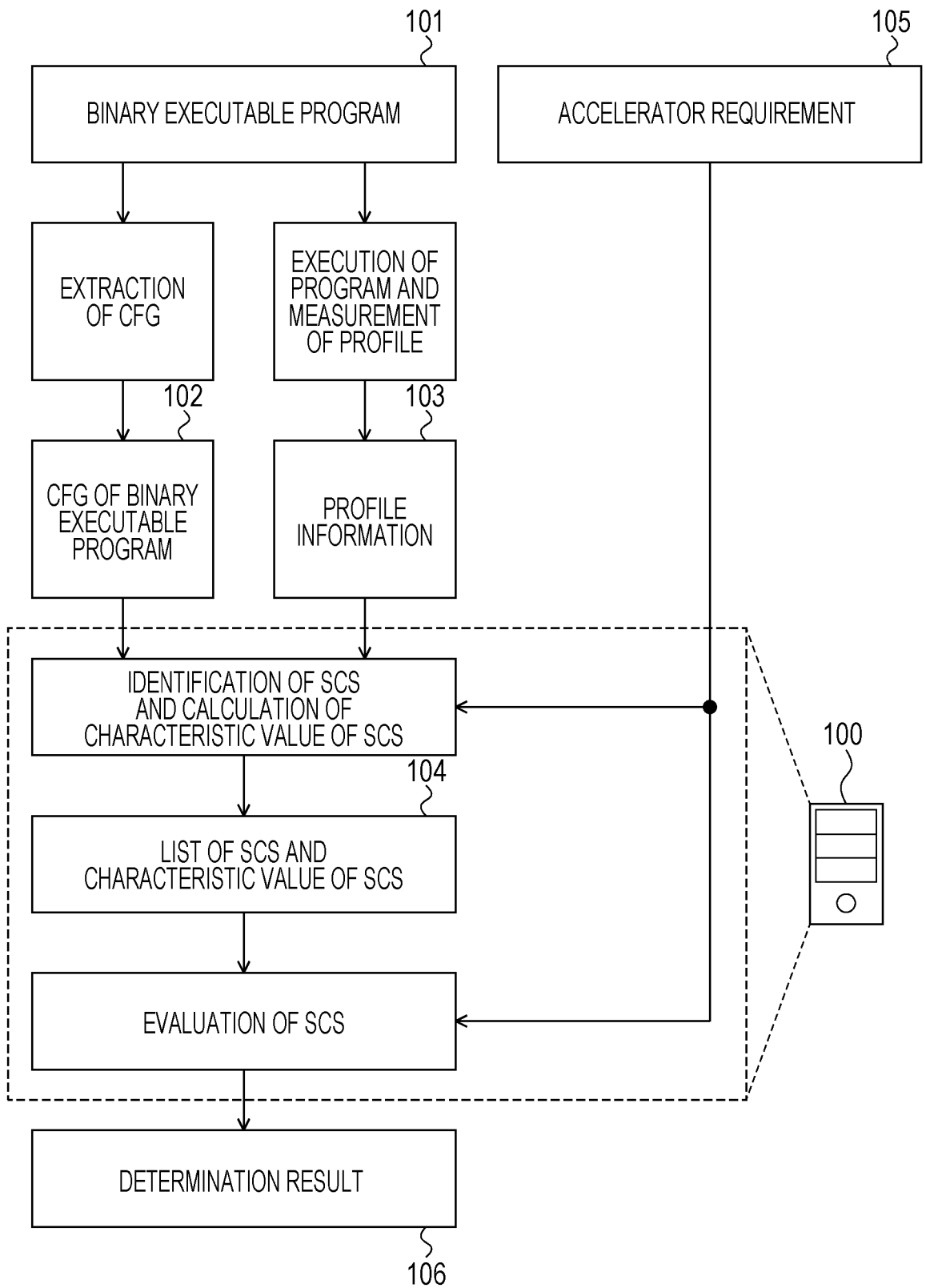
FIG. 1 is an exemplary diagram illustrating an example of an information processing method according to an embodiment.

FIG. 1 is a diagram describing an example of an information processing method according to the embodiment. An information processing device 100 is a computer that determines whether or not a process defined in a program is suitable to be executed by an accelerator.

The information processing device 100 is, for example, a server, a personal computer (PC), a tablet terminal, a smartphone, a wearable terminal, or the like. The accelerator is an FPGA, a GPU, large-scale integration (LSI), or the like.

It is desirable that the accelerator be installed in a system having a program implemented therein, execute all or one or more of a series of processes defined in the program to reduce a time period for the series of processes and improve the performance of the program in some cases. On the other hand, for example, it is considered that dedicated accelerators are generated for respective programs and execute all of a series of processes.

However, if the dedicated accelerators are generated for the respective programs, this may result in an increase in the cost. In addition, it may not be preferable that all the series of processes be executed by the accelerators. For example, from the perspective of the number of operations for the processes to be executed by the accelerators and the amount of data to be input and output by the accelerators to and from a memory, it is relatively preferable that only one or more of the series of processes be executed by the accelerators, and a time period for the series of processes may be reduced.

It is, therefore, desirable that all or one or more of the series of processes be selected and executed by the accelerators. On the other hand, for example, it is considered that a manufacturer of a system may consider any of processes that is suitable to be executed by an accelerator, select all or one or more of the series of processes, cause the accelerator to execute the selected one or more processes. In this case, the target to be considered may be a single process or may be a collection of multiple processes.

It is, however, difficult to determine whether or not any of the series of processes is suitable to be executed by the accelerator. For example, it is difficult to determine whether or not it is possible to reduce a time period for the series of the processes when any of the series of processes is executed by the accelerator. Thus, the manufacturer of the system may not efficiently reduce the time period for the series of the processes and may not improve the performance of a program. In addition, this may result in an increase in a time period for considering any of the series of the processes that is suitable to be executed by the accelerator, an increase in the burden on the manufacturer of the system, and an increase in the cost.

In addition, if a dedicated accelerator is not generated and a general-purpose accelerator is prepared and used in the system, and any of the processes is executable by the general-purpose accelerator, the process is executed by the general-purpose accelerator with its processing power. Thus, the manufacturer of the system may mistakenly cause the accelerator to execute a process that is not executable by the accelerator with the processing power of the accelerator. In addition, since the processing power of the accelerator is considered, the consideration may result in an increase in a time period for considering any of the processes that is suitable to be executed by the accelerator, an increase in the burden on the manufacturer of the system, and an increase in the cost.

In addition, if the number of processes that are suitable to be executed by the accelerator is larger than the number of accelerators able to be prepared in the system, it is difficult to determine any of the processes that is to be executed by the accelerator on a priority basis. Thus, the manufacturer of the system may not efficiently reduce the time period for the series of processes and efficiently improve the performance of the program. In addition, this may result in an increase in a time period for considering any of the processes that is suitable to be executed by the accelerator, an increase in the burden on the manufacturer of the system, and an increase in the cost.

In addition, the manufacturer of the system may be different from a designer of the program and may enter into a contract with the designer of the program, provide the system to the designer of the program, and have the designer of the program use the system. In this case, the designer of the program tends to hope to keep a source code of the program confidential before the contract is entered into between the manufacturer and the designer. If the designer of the program uses the system in order to consider whether or not the designer enters into the contract, the designer tends to hope to recognize whether or not the performance of the program is able to be improved by the accelerator.

It is, however, difficult for the manufacturer of the system to determine any of the series of processes that is suitable to be executed by the accelerator without referencing the source code of the program and notify the determined process to the designer of the program. Thus, the designer of the program may take a risk that the source code of the program is disclosed to the manufacturer of the system. In addition, if the source code of the program is not disclosed, the non-disclosure may result in an increase in a time period for determining any of the processes that is suitable to be executed by the accelerator, an increase in the burden on the manufacturer of the system, and an increase in the cost.

In addition, it is considered that the manufacturer of the system uses an event-based profiler, a statistical profiler, or the like to find a process suitable for the accelerator in units of functions defined in the program and causes the accelerator to execute the process.

The designer of the program, however, may have designed the program without knowing information on the accelerator, and it is difficult to find the process suitable for the accelerator in units of the functions defined in the program. In addition, if the event-based profiler is used, the program is rewritten, the performance of the program is changed, and it is hard to find the process suitable for the accelerator.

Thus, the embodiment describes an information processing method for referencing a control flow graph of a program and determining whether or not a process defined in a program is suitable to be executed by an accelerator. In the following description, a control flow graph is referred to as "CFG" in some cases.

In an example illustrated in FIG. 1, the information processing device 100 acquires a CFG 102 of a binary executable program 101. In the following description, the binary executable program 101 is merely referred to as "program 101" in some cases. The CFG 102 is a directed graph indicating the flow of a series of processes defined in the program 101. The CFG 102 includes nodes that indicate the series of processes defined in the program 101. In the CFG 102, each of directed edges connects nodes to each other. The nodes are also referred to as basic blocks, for example. Each of the directed edges connects a node indicating a certain process to a node indicating a process to be executed immediately after the certain process.

The information processing device 100 is connected to and communicates with another device, for example. For example, the other device extracts the CFG 102 from the program 101, generates the CFG 102 of the program 101, and transmits the CFG 102 of the program 101 to the information processing device 100. The information processing device 100 receives the CFG 102 of the program 101 from the other device.

In addition, the information processing device 100 acquires profile information 103 of the program 101. The profile information 103 includes information indicating characteristics of the processes indicated by the one or more nodes included in the CFG 102. The profile information 103 includes information indicating characteristics of each of the series of processes defined in the program 101. The information indicating the characteristics of the processes is information indicating the number of operations for each of the processes to be executed once.

The information processing device 100 is connected to and communicates with another device, for example. For example, the other device executes the program 101, measures a profile, generates the profile information 103, and transmits the profile information 103 to the information processing device 100. The information processing device 100 receives the profile information 103 from the other device.

The information processing device 100 identifies one or more strongly connected graphs included in the CFG 102 and stores a list 104 in which the one or more strongly connected graphs are recorded. Each of the one or more strongly connected graphs is a partial graph that is included in the CFG 102 and in which a directed path exists between each pair of nodes in the strongly connected graph. Each of the one or more strongly connected graphs may have a layered structure. Each of the one or more strongly connected graphs may include another strongly connected graph, for example. A strongly connected graph is hereinafter also referred to as a Strongly Connected Subcomponent (SCS).

The information processing device 100 may handle the series of processes in units of processes indicated by the SCSs, thereby easily determine a candidate to be executed by the accelerator in units of processes that are likely to be repeatedly called in the program 101. A process indicated by an SCS may be treated as a function and separated from the program 101. The function is referred to as kernel, for example. The function is repeatedly called. Thus, when the function is executed by the accelerator, a processing load applied to a CPU tends to be reduced.

The information processing device 100 calculates, based on the profile information 103, a characteristic value indicating a characteristic of a process indicated by each of the identified one or more SCSs and stores a list 104 in which the characteristic value is recorded. The characteristic value indicates the number of operations for a process indicated by each of the one or more SCSs and to be executed once. The characteristic value is obtained by summing the numbers of operations for processes indicated by one or more nodes included in the SCS.

The information processing device 100 calculates, as a characteristic value indicating the number of operations for a process indicated by each SCS and to be executed once, the result of summing the numbers of operations for processes indicated by one or more nodes included in the SCS. In this case, if the process indicated by the SCS is executed by the accelerator, the characteristic value may serve as an index indicating how much the processing load of the CPU is reduced, an index indicating whether or not the process indicated by the SCS is able to be executed with the processing power of the accelerator, or another index.

The information processing device 100 determines whether or not processes indicated by the SCSs are suitable to be executed by the accelerator, based on the calculated characteristic values of the SCSs and a requirement 105 set for the accelerator. Then, the information processing device 100 stores results 106 of the determination. The requirement 105 set for the accelerator is related to a process executable with the processing power of the accelerator. Specifically, the requirement 105 set for the accelerator indicates an upper limit of the number of operations executable with the processing power of the accelerator.

In addition, the requirement 105 set for the accelerator is related to the fact that it is determined that a process is suitable to be executed by the accelerator a value if the processing load of the CPU is reduced by a certain value or more. The requirement 105 set for the accelerator indicates a lower limit of the number of operations. In the following description, the requirement 105 set for the accelerator is referred to as "accelerator requirement 105" in some cases.

For example, if the number of operations that is calculated for an SCS is equal to or lower than the upper limit, indicated by the accelerator requirement 105, of the number of operations, the information processing device 100 determines that a process indicated by the SCS is executable with the processing power of the accelerator. If the process is executable with the processing power of the accelerator, the information processing device 100 determines that the process indicated by the SCS is suitable to be executed by the accelerator.

In addition, for example, if the number of operations that is calculated for an SCS is equal to or higher than the lower limit, indicated by the accelerator requirement 105, of operations, the information processing device 100 determines that if a process indicated by the SCS is executed by the accelerator, the processing load of the CPU is reduced by a certain value or more. Then, if the processing load of the CPU is reduced by the certain value or more, the information processing device 100 determines that the process indicated by the SCS is suitable to be executed by the accelerator.

Thus, within a relatively short time period, the information processing device 100 may determine whether or not a process indicated by an SCS is suitable to be executed by the accelerator, and the information processing device 100 may notify the result of the determination to the manufacturer of the system. In addition, the information processing device 100 may notify a characteristic value calculated for the process indicated by the SCS to the manufacturer of the system and recognize how much the process indicated by the SCS is suitable to be executed by the accelerator.

Thus, the manufacturer of the system may determine any of the series of processes defined in the program 101 so that the determined process is to be executed by the accelerator. Then, the manufacturer of the system causes the accelerator to execute all or one or more of the series of processes defined in the program 101 to reduce a time period for the series of processes and improve the performance of the program 101.

In addition, the information processing device 100 may receive the CFG 102 of the program 101 and the profile information 103 of the program 101 from the other device. Thus, the information processing device 100 may not reference the program 101 and may determine whether or not the processes indicated by the SCSs are suitable to be executed by the accelerator, while the program 101 is kept confidential. In addition, the information processing device 100 may not reference characteristics of data input to the program 101.

As a result, a designer of the program 101 may recognize whether or not the performance of the program 101 is able to be improved by the accelerator and determine whether or not the system is to be used, while the program 101, an execution environment, and the like are kept confidential. Thus, the designer of the program 101 may not take a risk that the program 101 is disclosed, and the manufacturer of the system and the designer of the program 101 may easily enter into a contract for the use of the system.

In addition, since the information processing device 100 handles the series of processes in units of the processes indicated by the SCSs, the information processing device 100 may determine whether or not each of the processes is suitable to be executed by the accelerator in units of processes able to be separated as functions from the program 101, instead of functions defined in the program 101. Thus, the information processing device 100 may easily find a process suitable to be executed by the accelerator. In addition, the information processing device 100 may inhibit the program 101 from being rewritten.

Although the case where the information processing device 100 receives the CFG 102 of the program 101 and the profile information 103 of the program 101 from the other device is described above, the information processing device 100 is not limited to this. For example, the information processing device 100 may extract the CFG 102 from the program 101 and generate the CFG 102 of the program 102. In addition, for example, the information processing device 100 may execute the program 101, measure the profile, and generate the profile information 103.

Although the case where the information processing device 100 identifies the SCSs, calculates the characteristic values of the SCSs, and determine whether or not each of the processes is suitable is described, the information processing device 100 is not limited to this. For example, an information processing device 100 that identifies the SCSs, an information processing device 100 that calculates the characteristic values of the SCSs, and an information processing device 100 that determines whether or not each of the processes is suitable may be different from each other. In this case, the information processing method according to the embodiment is achieved by causing the information processing devices to collaborate with each other.

The case where the information processing device 100 identifies the one or more SCSs included in the CFG 102 is described above. In this case, the information processing device 100 may analyze the CFG 102 and identify the one or more SCSs included in the CFG 102 as a result of the analysis of the CFG 102. Alternatively, the information processing device 100 may identify the one or more SCSs by receiving information that has been obtained by analyzing the CFG 102 by the other device and indicates the one or more SCSs included in the CFG 102, for example.

Example of Hardware Configuration of Information Processing Device 100

Next, an example of a hardware configuration of the information processing device 100 is described with reference to FIG. 2.

Figure 2:
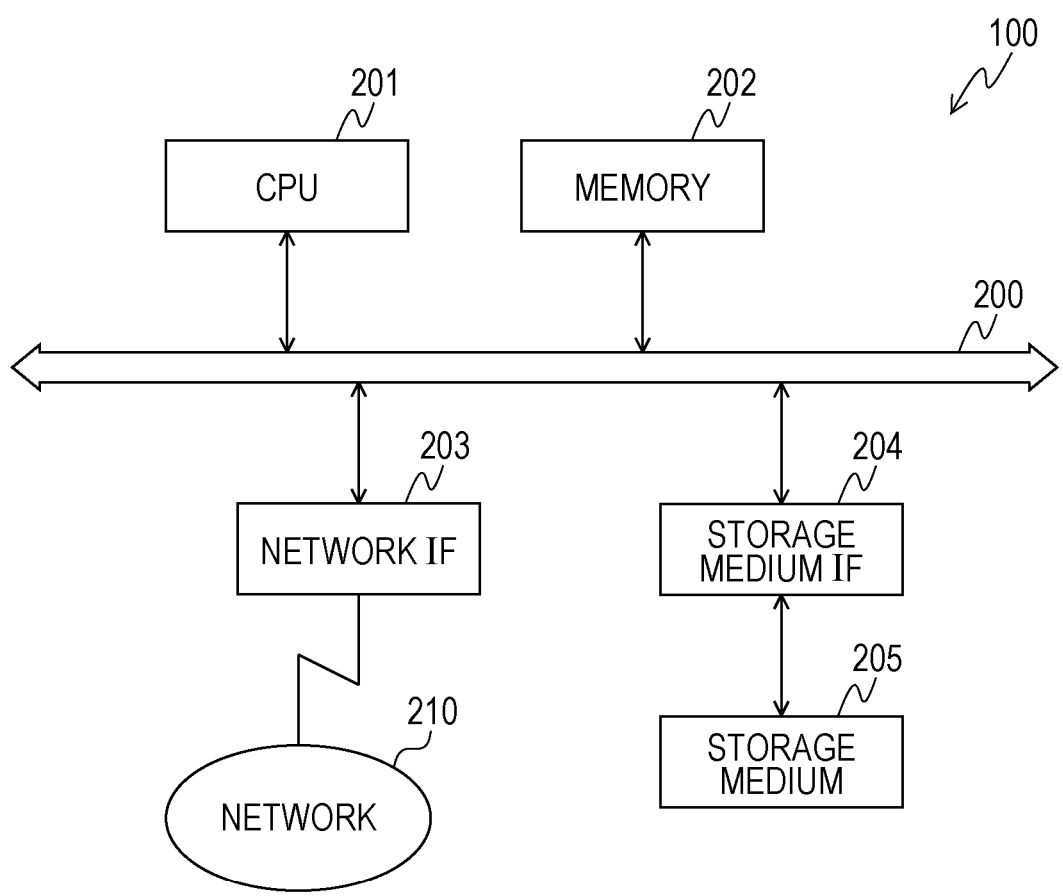
FIG. 2 is a block diagram illustrating an example of a hardware configuration of an information processing device.

FIG. 2 is a block diagram illustrating the example of the hardware configuration of the information processing device 100. In the example illustrated in FIG. 2, the information processing device 100 includes a CPU 201, a memory 202, a network interface (I/F) 203, a storage medium I/F 204, and a storage medium 205. The constituent units are connected to each other via a bus 200.

The CPU 201 controls the entire information processing device 100. The memory 202 includes a read only memory (ROM), a random access memory (RAM), a flash ROM, and the like, for example. Specifically, for example, the flash ROM and the ROM store various programs, and the RAM is used as a work area of the CPU 201. The programs stored in the memory 202 are loaded into the CPU 201 and cause the CPU 201 to execute coded processes.

The network I/F 203 is connected to a network 210 via a communication line and connected to another computer via the network 210. The network I/F 203 serves as an internal interface with the network 210 and controls input and output of data from and to the other computer. As the network I/F 203, a modem, a local area network (LAN) adapter, or the like may be used, for example.

The storage medium I/F 204 controls reading and writing of data from and to the storage medium 205 in accordance with control by the CPU 201. The storage medium I/F 204 is, for example, a disk drive, a solid state drive (SSD), a Universal Serial Bus (USB) port, or the like. The storage medium 205 is a nonvolatile memory that stores data written in accordance with control by the storage medium I/F 204. The storage medium 205 is, for example, a disk, a semiconductor memory, a USB memory, or the like. The storage medium 205 may be detachable from the information processing device 100.

The information processing device 100 may include a keyboard, a mouse, a display, a printer, a scanner, a microphone, a speaker, and the like, as well as the aforementioned constituent units. In addition, the information processing device 100 may include multiple storage medium I/Fs 204 and multiple storage media 205. In addition, the information processing device 100 may not include the storage medium I/F 204 and the storage medium 205.

Example of Functional Configuration of Information Processing Device 100

Next, an example of a functional configuration of the information processing device 100 is described with reference to FIG. 3.

Figure 3:
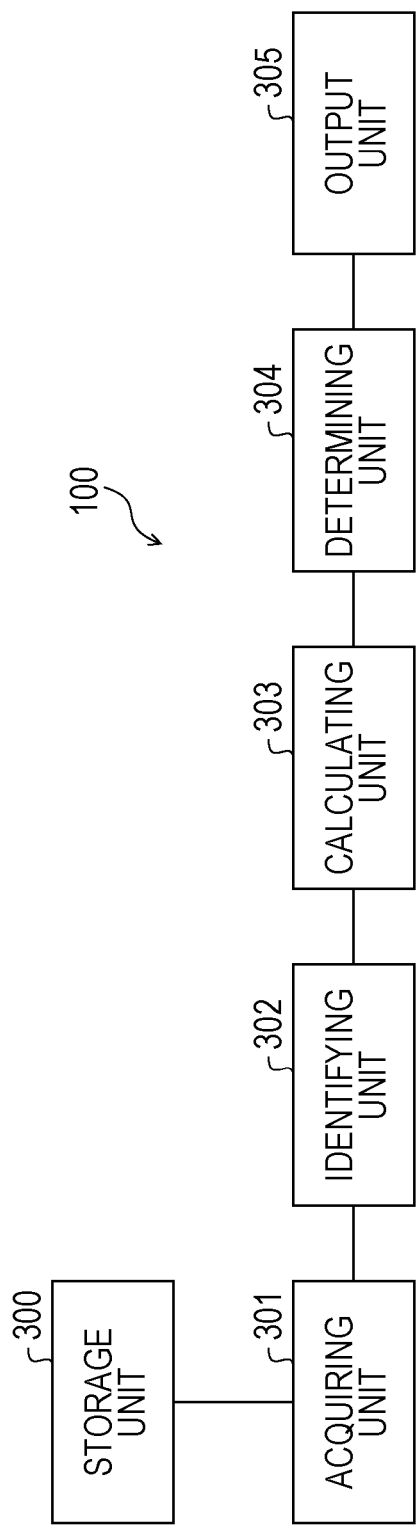
FIG. 3 is a block diagram illustrating an example of a functional configuration of the information processing device.

FIG. 3 is a block diagram illustrating the example of the functional configuration of the information processing device 100. The information processing device 100 includes a storage unit 300, an acquiring unit 301, an identifying unit 302, a calculating unit 303, a determining unit 304, and an output unit 305.

The storage unit 300 is achieved by a storage region of the memory 202 illustrated in FIG. 2, a storage region of the storage medium 205, or the like, for example. Although the case where the storage unit 300 is included in the information processing device 100 is described below, the storage unit 300 is not limited to this. For example, the storage unit 300 may be included in a device different from the information processing device 100, and details stored in the storage unit 300 may be referenced by the information processing device 100.

The units 301 to 305 are functions serving as a controller. Specifically, the functions of the units 301 to 305 are achieved by the network I/F 203 or by causing the CPU 201 to execute a program stored in a storage region of the memory 202 illustrated in FIG. 2, a storage region of the storage medium 205 illustrated in FIG. 2, or the like, for example. Results of processes by the functional units are stored in a storage region of the memory 202 illustrated in FIG. 2, a storage region of the storage medium 205 illustrated in FIG. 2, or the like, for example.

The storage unit 300 stores various types of information to be used for the processes of the functional units. The storage unit 300 stores various types of information acquired by the acquiring unit 301, for example. Specifically, the storage unit 300 stores the CFG of the program acquired by the acquiring unit 301. The CFG is a directed graph indicating the flow of the series of processes defined in the program. The CFG includes the nodes, each of which indicates a respective one of the series of processes defined in the program. In the CFG, each of directed edges connects a pair of the nodes. For example, each of the directed edges connects a node indicating a certain process to a node indicating a process to be executed immediately after the certain process.

The storage unit 300 stores the profile information of the program acquired by the acquiring unit 301. The profile information includes information indicating characteristics of the processes indicated by the one or more nodes included in the CFG. The profile information includes information indicating characteristics of the series of processes defined in the program and indicated by the one or more nodes included in the CFG. For example, the information indicating the characteristics of the processes indicates the number of operations for each of the processes to be executed once, the number of operations to be executed per unit of time for each of the processes, the amount of data to be accessed per unit of time for each of the processes, a time period for using an arithmetic process per unit of time for each of the processes, and the like. The number of operations to be executed per unit of time indicates the number of operations to be executed per unit of time for each of the processes, and is expressed in units of operations per second (Ops). In the following description, the number of operations for a process to be executed once is merely referred to as "the number of operations for the process" in some cases. The arithmetic device is, for example, the CPU 201.

The storage unit 300 stores an equation for the calculation of the characteristic values of the SCSs and stores the calculated characteristic values of the SCSs. The SCSs are partial graphs that are included in the CFG and in which a directed path exists between each pair of nodes. The characteristic values of the SCSs indicate characteristic values of the processes indicated by the SCSs. Characteristic values include, for example, a first characteristic value, a second characteristic value, a third characteristic value, and the like, which are described later.

Specifically, the storage unit 300 stores the first characteristic values. As the number of operations to be executed per unit of time for a process indicated by an SCS is larger or as the amount of data to be accessed per unit of time for the process indicated by the SCS is smaller, a first characteristic value of the process indicated by the SCS is larger. The first characteristic value indicates an operational intensity of the process indicated by the SCS, for example. The operational intensity is obtained by dividing the number of operations to be executed per unit of time for the process indicated by the SCS by the amount of data to be accessed per unit of time for the process indicated by the SCS, for example.

Specifically, the storage unit 300 stores the second characteristic values. Each of the second characteristic values indicates the number of operations for a process indicated by an SCS and to be executed once, for example. For example, the number of operations for the process indicated by the SCS is obtained by dividing the number of operations to be executed per unit of time for the process indicated by the SCS by the frequency at which the process indicated by the SCS is executed per unit of time. The execution frequency is obtained by dividing the number of operations to be executed per unit of time for the process indicated by the SCS by the number of self-operations for the process indicated by the SCS, where the number of self-operations for the process indicated by the SCS is obtained by summing the numbers of operations for processes indicated by one or more nodes included in the SCS.

The SCS may include another SCS. In this case, the execution frequency is obtained by dividing the result of subtracting the number of operations to be executed per unit of time for a process indicated by the other SCS from the number of operations to be executed per unit of time for the process indicated by the SCS by the number of self-operations for the process indicated by the SCS. In this case, the number of self-operations for the process indicated by the SCS is obtained by summing the numbers of operations for processes indicated by one or more nodes included in a partial graph obtained by removing the other SCS from the SCS.

Specifically, the storage unit 300 stores the third characteristic values. Each of the third characteristic values indicates a time period for using the arithmetic device per unit of time for a process indicated by an SCS, for example. The third characteristic value is obtained by summing time periods for using the arithmetic device per unit of time for processes indicated by one or more nodes included in the SCS. Specifically, the third characteristic value may be utilization indicating the ratio of a time period for using the arithmetic device to a short time period.

The storage unit 300 stores the acceleration requirement, for example. The acceleration requirement is related to a process executable with the processing power of the accelerator, for example. Specifically, the acceleration requirement indicates an upper limit of the number of operations that are executable with the processing power of the accelerator, for example. The accelerator requirement is related to the determination of how much and whether or not a process is suitable to be executed by the accelerator. The accelerator requirement indicates a threshold that is compared with the characteristic values and indicates that a process is suitable to be executed by the accelerator at a certain level or more.

The acquiring unit 301 acquires, from the storage unit 301, various types of information to be used for the processes to be executed by the functional units and outputs the acquired information to the other functional units. In addition, the acquiring unit 301 causes various types of information acquired from another device to be stored in the storage unit 300 or outputs the acquired information to the other functional units. The acquiring unit 301 receives the CFG of the program, the profile information of the program, and the like from another device and causes the received CFG, the received profile information, and the like to be stored in the storage unit 300, for example. The acquiring 301 may acquire the program if the information processing device 100 generates the CFG of the program, the profile information of the program, and the like.

The identifying unit 302 identifies the one or more SCSs included in the CFG of the program. For example, the identifying unit 302 identifies one or more SCSs included in the CFG and indicating a process for which the number of operations exceeds a predetermined value. If the acquiring unit 301 acquires the program, the identifying unit 302 may identify the one or more SCSs included in the CFG of the program after the generation of the CFG.

Thus, the identifying unit 302 may identify an SCS indicating a candidate process to be executed by the accelerator and cause the calculating unit 303 to reference the candidate process. In addition, the identifying unit 302 does not identify an SCS indicating a process for which the number of operations does not exceed the predetermined value and that is not relatively suitable to be executed by the accelerator, and the identifying unit 302 may reduce a processing load of the calculating unit 303.

The calculating unit 303 calculates characteristic values of the one or more SCSs identified by the identifying unit 302. The calculating unit 303 calculates a first characteristic value, a second characteristic value, a third characteristic value, and the like for each of the one or more SCSs.

Specifically, the calculating unit 303 sums the numbers of operations indicated by one or more nodes included in each of the one or more SCSs and calculates the number of self-operations for a process indicated by each of the one or more SCSs. The number of self-operations for a process indicated by each of the one or more SCSs indicates the result of summing the numbers of operations for processes indicated by one or more nodes included in each of the one or more SCSs. If an SCS includes another SCS, the number of self-operations for a process indicated by the SCS is calculated without the calculation of the number of self-operations for a process indicated by the other SCS.

A process indicated by any of one or more nodes included in an SCS may be a branch process. In this case, the calculating unit 303 weights and sums the numbers of operations for processes indicated by the one or more nodes included in the SCS, based on a branching probability of the branch process included in a process indicated by the SCS and calculates the number of self-operations for the process indicated by the SCS. Thus, the calculating unit 303 may accurately calculate the number of self-operations for the process indicated by the SCS. It is possible to accurately determine whether or not the process indicated by the SCS is suitable to be executed by the accelerator.

In addition, a certain SCS may include another SCS. In this case, the calculating unit 303 calculates, as the number of self-operations for a process indicated by the certain SCS, the result of summing the numbers of operations for processes indicated by one or more nodes included in a partial graph obtained by removing the other SCS from the certain SCS. Thus, the calculating unit 303 may accurately calculate the number of self-operations for the process indicated by the SCS, and it is possible to accurately determine whether or not the process indicated by the SCS is suitable to be executed by the accelerator.

In addition, a certain SCS may include another SCS and a process indicated by any of one or more nodes included in a partial graph obtained by removing the other SCS from the certain SCS may be a branch process. In this case, the calculating unit 303 weights and sums the numbers of operations for processes indicated by the one or more nodes included in the partial graph, based on a branching probability of the branch process included in a process indicated by the partial graph, and calculates the number of self-operations for a process indicated by the certain SCS. Thus, the calculating unit 303 may accurately calculate the number of self-operations for the process indicated by the SCS, and it is possible to determine whether or not the process indicated by the SCS is suitable to be executed by the accelerator.

Specifically, the calculating unit 303 sums the numbers of operations to be executed per unit of time for processes indicated by one or more nodes included in the SCS and calculates the number of operations to be executed per unit of time for the process indicated by the SCS.

A process indicated by any of one or more nodes included in an SCS may be called from multiple calling sources. Specifically, in this case, the calculating unit 303 weights and sums the numbers of operations to be executed per unit of time for processes indicated by the one or more nodes based on the numbers of times that the processes indicated by the one or more nodes included in the SCS have been called. In this case, the calculating unit 303 calculates the result of summing the numbers as the number of operations to be executed per unit of time for a process indicated by the SCS. Thus, the calculating unit 303 may accurately calculate the number of operations to be executed per unit of time for the process indicated by the SCS, and it is possible to accurately determine whether or not the process indicated by the SCS is suitable to be executed by the accelerator.

Specifically, the calculating unit 303 sums amounts of data to be accessed per unit of time for the processes indicated by the one or more nodes included in the SCS, thereby calculating the amount of data to be accessed per unit of time for the process indicated by the SCS.

Specifically, the calculating unit 303 calculates the frequency at which the process indicated by the SCS is executed per unit of time by dividing the number of operations to be executed per unit of time for the process indicated by the SCS by the number of self-operations for the process indicated by the SCS.

An SCS may include another SCS. In this case, specifically, the calculating unit 303 subtracts the number of operations to be executed per unit of time for a process indicated by the other SCS from the number of operations to be executed per unit of time for a process indicated by the SCS. Then, the calculating unit 303 calculates the frequency at which the process indicated by the SCS is executed per unit of time by dividing the result of the subtraction by the number of self-operations for the process indicated by the SCS. Thus, the calculating unit 303 may accurately calculate the frequency at which the process indicated by the SCS is executed per unit of time, and it is possible to accurately determine whether or not the process indicated by the SCS is suitable to be executed by the accelerator.

Specifically, the calculating unit 303 calculates, as a first characteristic value, an operational intensity obtained by dividing the number of operations to be executed per unit of time for a process indicated by an SCS by the amount of data to be accessed per unit of time for the process indicated by the SCS. Thus, the calculating unit 303 may provide, to the determining unit 304, an index for determining whether or not the processing power of the program is improved by a certain value or more when the process is executed by the accelerator.

Specifically, the calculating unit 303 calculates, as a second characteristic value, the number of operations for a process indicated by an SCS and to be executed once. The number of operations for the process indicated by the SCS and to be executed once is obtained by dividing the number of operations to be executed per unit of time for the process indicated by the SCS by the frequency at which the process indicated by the SCS is executed per unit of time. Thus, the calculating unit 303 may provide, to the determining unit 304, an index for determining whether or not the process is executable with the processing power of the accelerator.

In addition, specifically, the calculating unit 303 sums time periods for using the arithmetic device per unit of time for processes indicated by one or more nodes included in an SCS and calculates, as a third characteristic value, a time period for using the arithmetic device per unit of time for the process indicated by the SCS. Thus, the calculating unit 303 may provide, to the determining unit 304, an index for determining whether or not the processing load of the CPU 201 is reduced by a certain value or more when the process is executed by the accelerator.

The determining unit 304 determines whether or not the processes indicated by the SCSs are suitable to be executed by the accelerator, based on the characteristic values, calculated by the calculating unit 303, of the SCSs and the requirement set for the accelerator.

For example, if the first characteristic value calculated by the calculating unit 303 exceeds a first threshold set for the accelerator, the determining unit 304 determines that the process indicated by the SCS is suitable to be executed by the accelerator. Thus, the determining unit 304 may determine that a process that causes the processing power of the program to be improved by a certain value or more when the process is executed by the accelerator is suitable to be executed by the accelerator.

For example, if the second characteristic value calculated by the calculating unit 303 is lower than a second threshold set for the accelerator, the determining unit 304 determines that the process indicated by the SCS is suitable to be executed by the accelerator. Thus, the determining unit 304 may determine that a process that is executable with the processing power of the accelerator is suitable to be executed by the accelerator.

For example, if the third characteristic value calculated by the calculating unit 303 exceeds a third threshold set for the accelerator, the determining unit 304 determines that the process indicated by the SCS is suitable to be executed by the accelerator. Thus, the determining unit 304 may determine that a process that causes the processing load of the CPU 201 to be reduced by a certain value or more when the process is executed by the accelerator is suitable to be executed by the accelerator.

For example, the determining unit 304 may use the frequency, as a fourth characteristic value, the frequency at which a process indicated by an SCS is executed per unit of time and that has been calculated by the calculating unit 303. For example, if the fourth characteristic value exceeds a fourth threshold set for the accelerator, the determining unit 304 determines that the process indicated by the SCS is suitable to be executed by the accelerator. Thus, the determining unit 304 may determine that a process that causes the processing load of the CPU 201 to be reduced by a certain value or more when the process is executed by the accelerator is suitable to be executed by the accelerator.

For example, if the calculated second characteristic value exceeds a fifth threshold set for the accelerator, the determining unit 304 may determine that the process indicated by the SCS is suitable to be executed by the accelerator. The fifth threshold is smaller than the second threshold, for example. Thus, the determining unit 304 may determine that a process that causes the processing power of the program to be improved by a certain value or more when the process is executed by the accelerator is suitable to be executed by the accelerator.

The output unit 305 outputs results of the processes by the functional units. A method for the output is displaying on a display, printing and outputting by a printer, transmission by the network I/F 203 to an external device, or storage in a storage region of the memory 202, a storage region of the storage medium 205, or the like. The output unit 305 outputs the results of the determination by the determining unit 304.

Thus, the output unit 305 may notify the results of the processes by the functional units to a user, support the management and operation of the information processing device 100, the update of set values of the information processing device 100, and the like, and improve the usability of the information processing device 100. The output unit 305 may notify the results of the determination by the determining unit 304 to the user and easily determine whether or not a process that is suitable to be executed by the accelerator exists among the series of processes defined in the program and determine whether or not any of the processes is to be executed by the accelerator.

Example of Source Code 400 of Program

Next, operational examples of the information processing device 100 are described with reference to FIGS. 4 to 12. First, an example of a source code 400 of the program is described with reference to FIG. 4.

FIG. 4 is an explanatory diagram illustrating the example of the source code 400 of the program. As illustrated in FIG. 4, statements are defined in rows L1 to L14 of the source code 400 of the program. The information processing device 100 or a device that is different from the information processing device 100 generates a CFG 500 from the source code 400 illustrated in FIG. 4. An example of the CFG 500 generated from the source code 400 illustrated in FIG. 4 is described below with reference to FIG. 5.

Example of CFG 500

Figure 5:
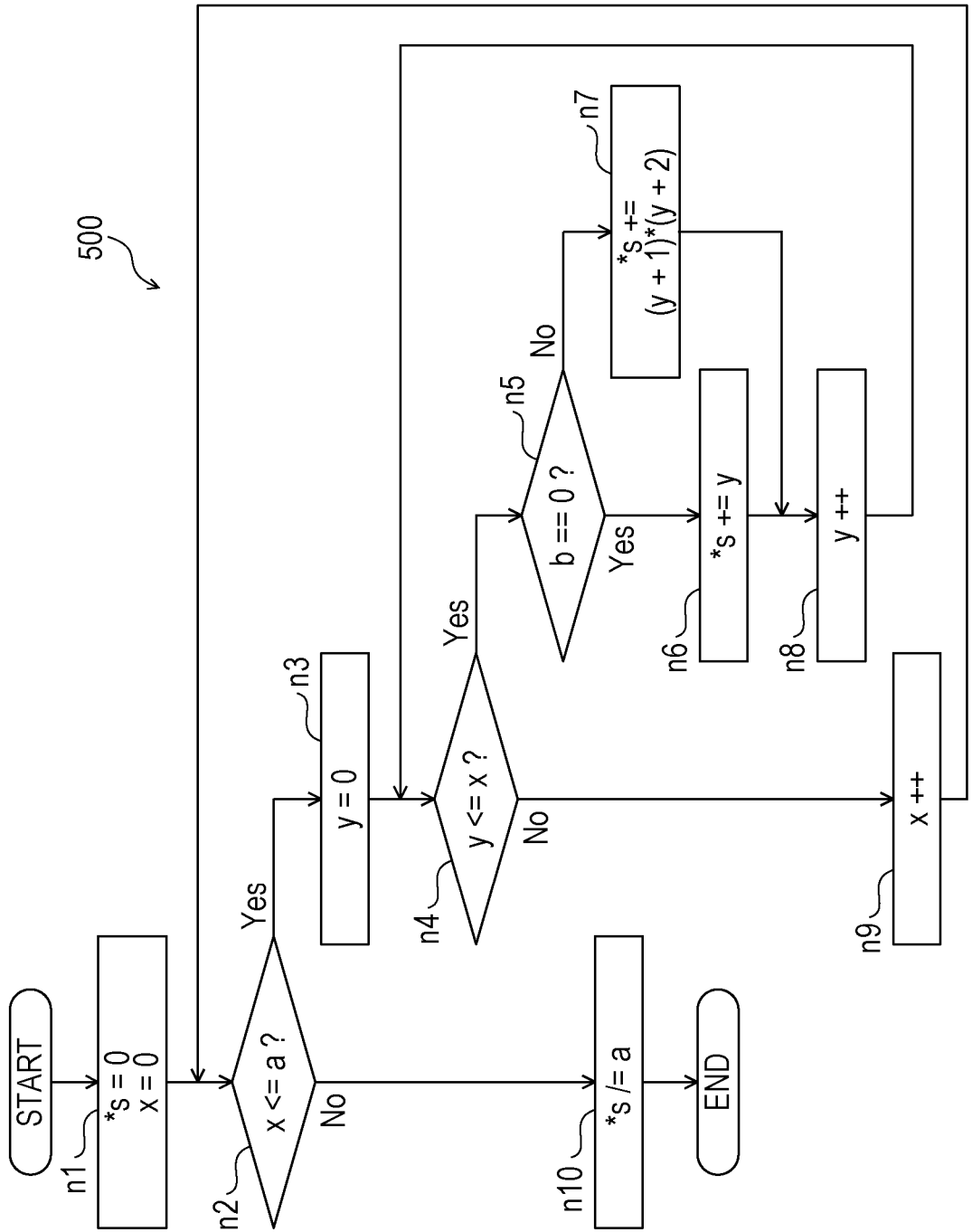
FIG. 5 is an explanatory diagram illustrating an example of a CFG.

FIG. 5 is an explanatory diagram illustrating the example of the CFG 500. As illustrated in FIG. 5, the CFG 500 includes a start block, an end block, and basic blocks n1 to n10. The start block and the end block do not indicate a specific process and are special basic blocks indicating the start and end of a series of processes indicated by an entire program. A directed edge is connected from the start block to the basic block n1.

The basic block n1 indicates processes of the statements described in the rows L1 and L2 of the source code 400 illustrated in FIG. 4, for example. A directed edge is connected from the basic block n1 to the basic block n2. The basic block n2 indicates a process of the statement described in the row L3 of the source code 400 illustrated in FIG. 4, for example. Directed edges are connected from the basic block n2 to the basic blocks n3 and n10.

The basic block n3 indicates a process of the statement described in the row L4 of the source code 400 illustrated in FIG. 4, for example. A directed edge is connected from the basic block n3 to the basic block n4. The basic block n4 indicates a process of the statement described in the row L5 of the source code 400 illustrated in FIG. 4, for example. Directed edges are connected from the basic block n4 to the basic blocks n5 and n9.

The basic block n5 indicates a process of the statement described in the row L6 of the source code 400 illustrated in FIG. 4, for example. Directed edges are connected from the basic block n5 to the basic blocks n6 and n7. The basic block n6 indicates a process of the statement described in the row L7 of the source code 400 illustrated in FIG. 4, for example. A directed edge is connected from the basic block n6 to the basic block n8.

The basic block n7 indicates a process of the statement described in the row L9 of the source code 400 illustrated in FIG. 4, for example. A directed edge is connected from the basic block n7 to the basic block n8. The basic block n8 indicates a process of the statement described in the row L10 of the source code 400 illustrated in FIG. 4, for example. A directed edge is connected from the basic block n8 to the basic block n4.

The basic block n9 indicates a process of the statement described in the row L12 of the source code 400 illustrated in FIG. 4, for example. A directed edge is connected from the basic block n9 to the basic block n2. The basic block n10 indicates a process of the statement described in the row L14 of the source code 400 illustrated in FIG. 4, for example. A directed edge is connected from the basic block n10 to the end block.

The information processing device 100 or the other device identifies one or more SCSs included in the CFG 500 illustrated in FIG. 5. As a technique for identifying the one or more SCSs, the following Reference Document 1 and the following Reference Document 2 may be referenced.

Reference Document 1: F. Bourdoncle, "Efficient chaotic iteration strategies with widenings", Formal Methods in Programming and their Applications, Springer, Berlin, Heidelberg, 1993.

Reference Document 2: Frances E. Allen, "Control flow analysis", ACM Sigplan Notices, Vol. 5, No. 7, ACM, 1970.

The information processing device 100 or the other device identifies the one or more SCSs by repeatedly applying the strongly connected component (SCC) decomposition algorithm described in the aforementioned Reference Document 1, for example.

Specifically, the information processing device 100 or the other device stores, as an SCS, an SCC obtained by applying the SCC decomposition algorithm to the CFG 500. In addition, the information processing device 100 or the other device applies the SCC decomposition algorithm to the obtained SCC again, identifies an SCC included in the SCC, and stores the identified SCC as an SCS. Thus, the information processing device 100 or the other device may generate a list of SCSs. An example of the one or more SCSs included in the CFG 500 illustrated in FIG. 5 is described below with reference to FIG. 6.

Example of One or More SCSs

Figure 6:
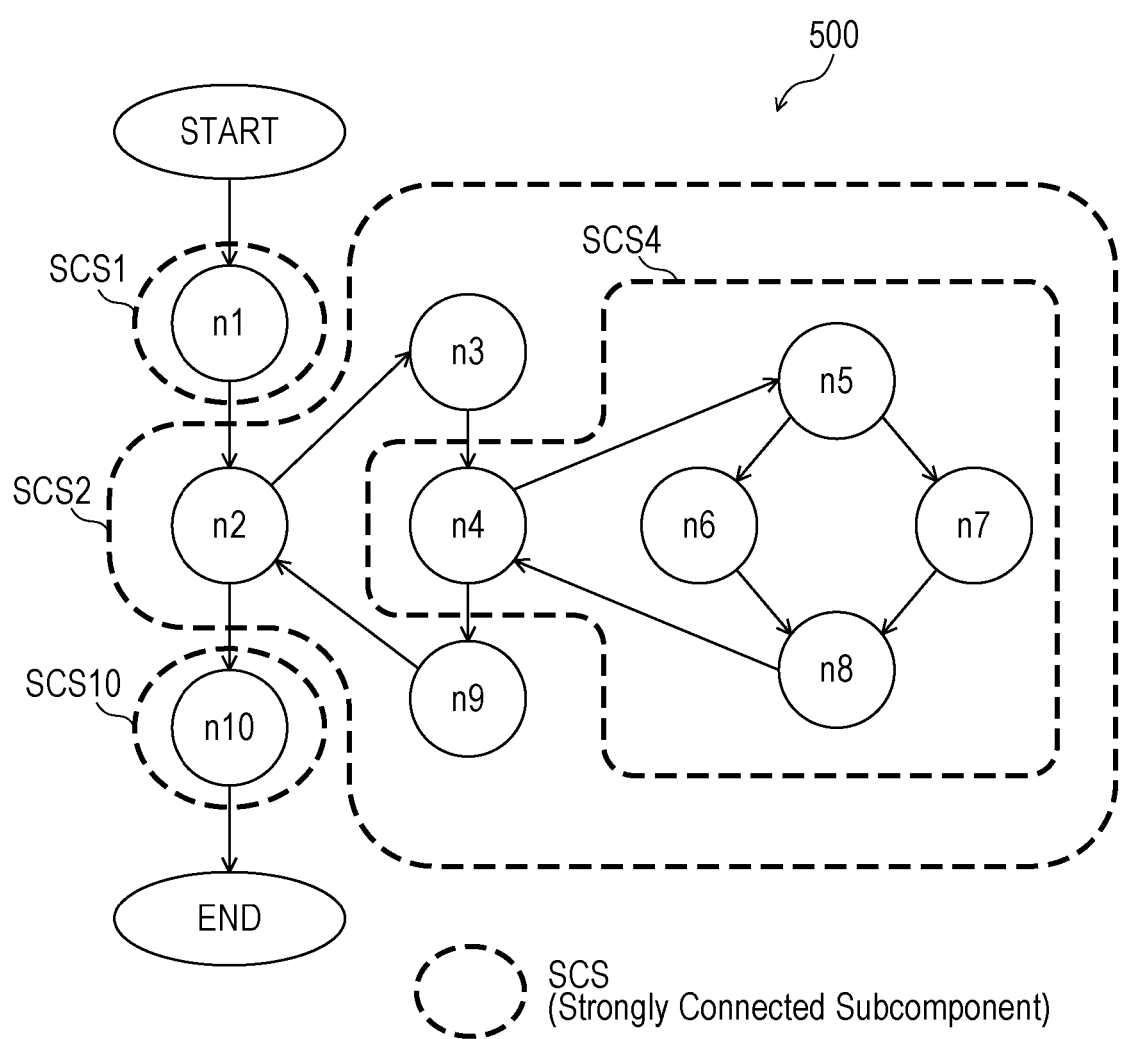
FIG. 6 is an explanatory diagram illustrating an example of one or more SCSs.

FIG. 6 is an exemplary diagram illustrating an example of the one or more SCSs. As illustrated in FIG. 6, the CFG 500 includes an SCS 1, an SCS 2, an SCS 4, and an SCS 10. The SCS 1 includes the basic block n1. The SCS 2 includes the basic blocks n2 to n9. The SCS 2 corresponds to a while loop included in the program. The SCS 4 includes the basic blocks n4 to n8. The SCS 4 is included in the SCS 2. The SCS 10 includes the basic block n10.

In the identification of the one or more SCSs included in the CFG 500. The information processing device 100 or the other device may identify an SCS satisfying a predetermined requirement and may not identify an SCS that does not satisfy the predetermined requirement. The information processing device 100 or the other device may not identify an SCS indicating a process for which the number of operations is equal to or smaller than a certain value, for example. In addition, the information processing device 100 or the other device may not identify an SCS included in another SCS, for example. In addition, the information processing device 100 or the other device may not identify an SCS included in a certain number of SCSs or more to suppress the number of layers of the SCSs to a certain number or less.

Then, the information processing device 100 or the other device executes the program and generates profile information of the program. The information processing device 100 or the other device may identify one or more SCSs after generating the profile information of the program. An example in which the profile information of the program is generated is described below with reference to FIG. 7.

Example in which Profile Information of Program is Generated

Figure 7:
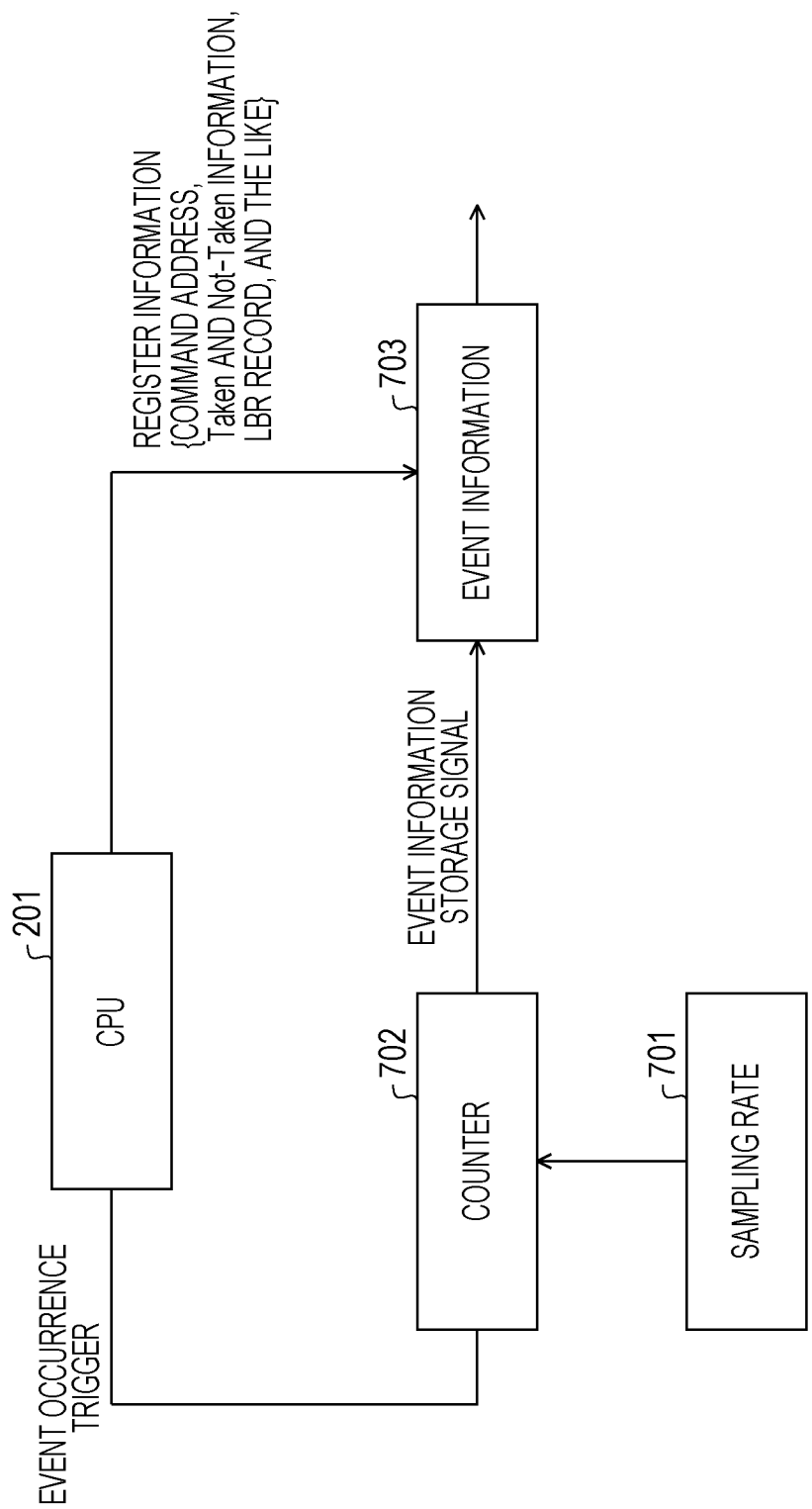
FIG. 7 is an explanatory diagram illustrating an example in which profile information of the program is generated.

FIG. 7 is an explanatory diagram illustrating the example in which the profile information of the program is generated. As illustrated in FIG. 7, when a prespecified event occurs, the CPU 201 uses an event occurrent trigger to increase a value of a counter 702 for the event that has occurred. The event is, for example, a timer, operation execution, memory access, branch command execution, or the like. The information processing device 100 includes a performance monitor counter (PMC) circuit, for example.

When the value of the counter 702 becomes equal to a value of a sampling rate 701, the PMC circuit generates an event information storage signal and stores event information 703 based on register information of the CPU 201 upon the generation of the event information storage signal. The register information is, for example, a command address, taken and not-taken information, an LBR record, and the like. Thus, an event that has occurred and the register information upon the occurrence of the event may be statistically sampled based on the value of the sampling rate 701. Next, an example of the event information 703 obtained by the sampling is described with reference to FIG. 8.

Example of Event Information 703

FIG. 8 is an exemplary diagram illustrating the example of the event information 703. As illustrated in FIG. 8, the information processing device 100 uses an event information table 800 to store the event information 703 in which time (seconds) when an event has occurred, the event that has occurred, a command address, a branch taken or not taken are associated with each other.

The command address is a command address at which the event has occurred. The information processing device 100 may identify, based on the command address, a basic block in which the event has occurred. To simplify the description, command addresses are expressed by the rows L1 to L14 illustrated in FIG. 4. The branch taken or not taken indicates whether a branch process result indicates taken or not taken if a branch command execution event has occurred. For example, if a branch conditional expression is true, the branch process result indicates taken. If the branch conditional expression is false, the branch process result indicates not taken.

The information processing device 100 may calculate the number of execution operation events based on an execution operation event. An execution operation event occurs at each of command addresses L2 and L1 within a time period of 1 second. L1 and L2 belong to the basic block n1. If the rate of sampling an execution operation event is 10 millions per second, the number of execution operation events in the basic block n1 is (1+1)*10 millions=20 million times per second. The number of execution operation events is stored as the number of operations to be executed per unit of time in a profile information table 900 described later, for example.

The information processing device 100 may calculate, based on a timer event, the CPU utilization for each of the basic blocks by calculating ratios of the numbers of events in basic blocks including command addresses. The CPU utilization is stored using the profile information table 900 described later, for example. The information processing device 100 may calculate, based on a branch command execution event, a branching probability of each branch process by counting the number of times that taken is selected and the number of times that not taken is selected. The branch probabilities are stored using the profile information table 900 described later with reference to FIG. 9, for example.

The information processing device 100 may multiply, based on a last level cache (LLC) miss event, the number of times that an LLC miss event occurs per second by the size of a cache line, thereby calculating the amount of data to be accessed. In the following description, the amount of data to be accessed per unit of time is referred to as "memory access amount" in some cases. The memory access amount is stored using the profile information table 900 described later with reference to FIG. 9, for example. An example of the profile information table 900 is described below with reference to FIG. 9.

Example of Profile Information Table 900

FIG. 9 is an explanatory diagram illustrating the example of the profile information table 900. As illustrated in FIG. 9, the information processing device 100 stores, in the profile information table 900, the basic blocks, row numbers of the rows in which statements of the processes indicated by the basic blocks are described, the SCSs to which the basic blocks belong, and the numbers of operations for the processes indicated by the basic blocks and to be executed once, while the row numbers, the SCSs, and the numbers of operations for the processes indicated by the basic blocks are associated with the basic blocks in the profile information table 900.

In addition, the information processing device 100 stores, in the profile information table 900, calculated numbers of operations to be executed per unit of time, calculated memory access amounts, calculated CPU utilization, and calculated branching probabilities, while the calculated numbers of operations to be executed per unit of time, the calculated memory access amounts, the calculated CPU utilization, and the calculated branching probabilities are associated with the basic blocks in the profile information table 900. The information processing device 100 calculates characteristic values of a process indicated by an SCS based on the profile information table 900. Next, an example of the calculation of the characteristic values of the process indicated by the SCS is described below with reference to FIGS. 10 and 11.

Example of Calculation of Characteristic Value of Process Indicated by SCS

Figure 10:
FIG. 10 is a diagram illustrating a first example of the calculation of characteristic values of a process indicated by an SCS.
Figure 11:
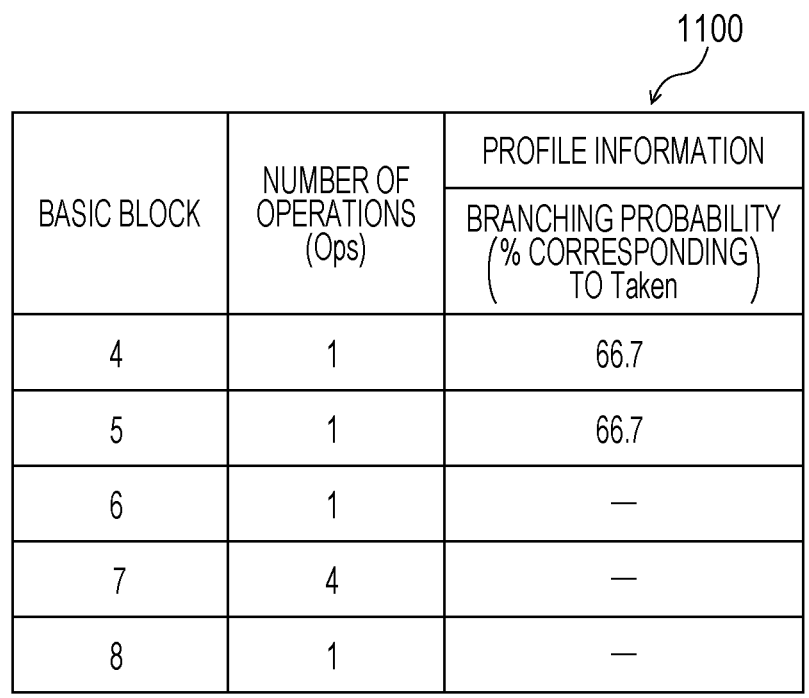
FIG. 11 is a diagram illustrating a second example of the calculation of characteristic values of the process indicated by the SCS.

FIGS. 10 and 11 are explanatory diagrams illustrating the example of the calculation of the characteristic values of the process indicated by the SCS. As illustrated in FIG. 10, the information processing device 100 calculates characteristic values of a process indicated by the SCS 4 based on profile information 1000 of basic blocks belonging to the SCS 4. The characteristic values are, for example, the numbers of operations to be executed per unit of time, memory access amounts, and the CPU utilization.

For example, the information processing device 100 sums the numbers of operations to be executed per unit of time for the processes indicated by the basic blocks belonging to the SCS 4 and calculates (the number of operations to be executed per unit of time for the process indicated by the SCS 4)=150+160+100+200+140=750 (MOps/s). The number of operations to be executed per unit of time for the process indicated by the SCS 4 is stored using a characteristic table 1200 described later with reference to FIG. 12, for example.

In addition, the information processing device 100 sums the memory access amounts of the processes indicated by the basic blocks belonging to the SCS 4 and calculates (the memory access amount of the process indicated by the SCS 4)=0+0+400+200+0=600 (Mbytes/s). The memory access amount of the process indicated by the SCS 4 is stored using the characteristic table 1200 described later with reference to FIG. 12, for example.

In addition, the information processing device 100 sums the memory access amounts of the processes indicated by the basic blocks belonging to the SCS 4 and calculates (the CPU utilization for the process indicated by the SCS 4)=12+12+16+23+12=75%. The CPU utilization for the process indicated by the SCS 4 is stored using the characteristic table 1200 described later with reference to FIG. 12, for example.

As illustrated in FIG. 11, the information processing device 100 calculates, based on the profile information 1100 of the basic blocks belonging to the SCS 4, the number of self-operations for the process indicated by the SCS 4. If the SCS 4 does not include a lower-level SCS, the number of self-operations for the process indicated by the SCS 4 is the result of summing the numbers of operations for the processes indicated by the basic blocks included in the SCS 4. The lower-level SCS is another SCS included in the SCS 4.

On the other hand, if the SCS 4 includes the lower-level SCS, the number of self-operations for the process indicated by the SCS 4 is the result of summing the numbers of operations for processes indicated by basic blocks that are among the basic blocks included in the SCS 4 and exclude a basic block included in the lower-level SCS. In this example, the SCS 4 does not include the lower-level SCS.

In addition, if a process indicated any of the basic blocks included in the SCS 4 is a branch process, the number of self-operations for the process indicated by the SCS 4 is obtained by weighting, based on a branching probability, the numbers of operations for the processes indicated by the basic blocks. In this example, the process indicated by the basic block n5 included in the SCS 4 is the branch process.

In addition, in the basic block n5, a branch to the basic block n6 or a Yes branch corresponds to taken, and a branching probability at which the branch to the basic block n6 is selected is 66.7%, which is stored in the profile information table 900. Thus, a branching probability at which a branch to the basic block n7 is selected is 100−66.7=33.3%. The other basic blocks n4, n5, and n8 included in the SCS 4 are executed regardless of the branch process.

Thus, the information processing device 100 gives a weight of 0.667 to the number of operations for the process indicated by the basic block n6, gives a weight of 0.333 to the number of operations for the process indicated by the basic block n7, and maintains the numbers of operations for the processes indicated by the basic blocks n4, n5, and n8. Then, the information processing device 100 calculates (the number of self-operations for the process indicated by the SCS 4)=1+1+0.667*1+0.333*4+1=5 (Ops).

Then, the information processing device 100 calculates the frequency at which the process indicated by the SCS 4 is executed per unit of time, the number of operations for the process indicated by the SCS 4, and an operational intensity of the process indicated by the SCS 4 based on the calculated number of operations to be executed per unit of time, the calculated memory access amount, and the calculated number of self-operations.

For example, the information processing device 100 calculates (the frequency at which the process indicated by the SCS 4 is executed per unit of time)=((the number of operations to be executed per unit of time for the process indicated by the SCS 4)−(the number of operations to be executed per unit of time for a process indicated by the lower-level SCS))/(the number of self-operations for the process indicated by the SCS 4). Since the SCS 4 does not include the lower-level SCS, the information processing device 100 calculates (the frequency at which the process indicated by the SCS 4 is executed per unit of time)=(750−0)/5=150 (million times/s). The frequency at which the process indicated by the SCS 4 is executed per unit of time is stored using the characteristic value table 1200 described later with reference to FIG. 12, for example.

In addition, the information processing device 100 calculates (the number of operations for the process indicated by the SCS 4)=(the number of operations to be executed per unit of time for the process indicated by the SCS 4)−(the frequency at which the process indicated by the SCS 4 is executed per unit of time). Specifically, the information processing device 100 calculates (the number of operations for the process indicated by the SCS 4)=750/150=5 (Ops). In this example, since the SCS 4 does not include the lower-level SCS, the number of operations for the process indicated by the SCS 4 is equal to the number of self-operations for the process indicated by the SCS 4. The number of operations for the process indicated by the SCS 4 is stored using the characteristic value table 1200 described later with reference to FIG. 12, for example.

The information processing device 100 calculates (the operational intensity of the process indicated by the SCS 4)=(the number of operations to be executed per unit of time for the process indicated by the SCS 4)/(the memory access amount of the process indicated by the SCS 4). Specifically, the information processing device 100 calculates (the operational intensity of the process indicated by the SCS 4)=750/600=1.25 (Ops/byte). The operational intensity of the process indicated by the SCS 4 is stored using the characteristic value table 1200 described later with reference to FIG. 12, for example.

In the same manner, the information processing device 100 calculates the number of operations to be executed per unit of time, a memory access amount, the number of self-operations, and the like for the process indicated by the SCS 2 and calculates the frequency at which the process indicated by the SCS 2 is executed per unit of time, the number of operations for the process indicated by the SCS 2, and the operational intensity for the process indicated by the SCS 2.

For example, the information processing device 100 calculates (the number of operations to be executed per unit of time for the process indicated by the SCS 2)=(the result of summing the numbers of operations to be executed per unit of time for the processes indicated by the basic blocks n2 to n9). Specifically, the information processing device 100 calculates (the number of operations to be executed per unit of time for the process indicated by the SCS 2)=50+40+150+160+100+200+140+60=900 (MOps/s). The number of operations to be executed per unit of time for the process indicated by the SCS 2 is stored using the characteristic value table 1200 described later with reference to FIG. 12, for example.

The information processing device 100 calculates (the number of self-operations for the process indicated by the SCS 2)=(the result of summing the numbers of operations for the processes indicated by the basic blocks n2, n3, and n9 that are not included in the SCS 4). Specifically, the information processing device 100 calculates (the number of self-operations for the process indicated by the SCS 2)=1+1+1=3 (Ops). The number of self-operations for the process indicated by the SCS 2 is stored using the characteristic value table 1200 described later with reference to FIG. 12, for example.

For example, the information processing device 100 calculates (the frequency at which the process indicated by the SCS 2 is executed per unit of time)=(the number of operations to be executed per unit of time for the process indicated by the SCS 2)−(the number of operations to be executed per unit of time for the process indicated by the lower-level SCS)/(the number of self-operations for the process indicated by the SCS 2). In this case, the lower-level SCS is the SCS 4. Specifically, the information processing device 100 calculates (the frequency at which the process indicated by the SCS 2 is executed per unit of time)=(900−750)/3=50 (million times/s). The frequency at which the process indicated by the SCS 2 is executed per unit of time is stored using the characteristic value table 1200 described later with reference to FIG. 12, for example.

For example, the information processing device 100 calculates (the number of operations for the process indicated by the SCS 2)=(the number of operations to be executed per unit of time for the process indicated by the SCS 2/the frequency at which the process indicated by the SCS 2 is executed per unit of time). Specifically, the information processing device 100 calculates (the number of operations for the process indicated by the SCS 2)=900/50=18 (Ops). The number of operations for the process indicated by the SCS 2 is stored using the characteristic value table 1200 described later with reference to FIG. 12, for example.

For example, the information processing device 100 calculates (the operational intensity of the process indicated by the SCS 2)=(the number of operations to be executed per unit of time for the process indicated by the SCS 2/the memory access amount of the process indicated by the SCS 2). Specifically, the information processing device 100 calculates 1.5 (Ops/byte) as the operational intensity of the process indicated by the SCS 2. The operational intensity of the process indicated by the SCS 2 is stored using the characteristic value table 1200 described later with reference to FIG. 12, for example. Next, an example in which whether or not a process is suitable to be executed by the accelerator is determined based on the characteristic value table 1200 is described below with reference to FIG. 12.

Example in which Whether or not Process is Suitable to be Executed by Accelerator is Determined FIG. 12 is an explanatory diagram illustrating the example in which whether or not the process is suitable to be executed by the accelerator is determined. As illustrated in FIG. 12, the information processing device 100 uses the characteristic value table 1200 to store characteristic values calculated for the process indicated by the SCS 1, the process indicated by the SCS 2, the process indicated by the SCS 4, and the process indicated by the SCS 10.

The information processing device 100 references the characteristic value table 1200 and determines whether or not the characteristic values calculated for the process indicated by the SCS 1, the process indicated by the SCS 2, the process indicated by the SCS 4, and the process indicated by the SCS 10 satisfy the accelerator requirement. The accelerator requirement includes a requirement in which the CPU utilization is 70% or more, a requirement in which the number of operations is 30 Ops or less, and a requirement in which an operational intensity is 1.2 Ops/byte or more.

In the example illustrated in FIG. 12, the information processing device 100 determines that the characteristic values of the process indicated by the SCS 2 and the characteristic values of the process indicated by the SCS 4 satisfy the accelerator requirement. Then, the information processing device 100 determines that the program includes the processes suitable to be executed by the accelerator, and the information processing device 100 identifies the process indicated by the SCS 2 and the process indicated by the SCS 4 as candidate processes to be executed by the accelerator.

If the processing power of the accelerator is low and the accelerator requirement includes a requirement in which the number of operations is 10 Ops or less, the information processing device 100 may determine that the process indicated by the SCS 2 is not a candidate process to be executed by the accelerator. In addition, in the identification of an SCS, the information processing device 100 may not identify the SCS 2. Thus, the information processing device 100 may reduce the processing load, compared with the case where characteristic values are calculated for all SCSs that may be identified.

Accordingly, the information processing device 100 may determine whether or not a process indicated by an SCS is suitable to be executed by the accelerator, and the information processing device 100 may notify the result of the determination to the manufacturer of the system. In addition, the information processing device 100 may notify characteristic values calculated for the process indicated by the SCS to the manufacturer of the system and may recognize how much the process indicated by the SCS is suitable to be executed by the accelerator.

In addition, it is sufficient if the information processing device 100 references the CFG 500 of the program and the profile information table 900 of the program, and the information processing device 100 may not reference the source code 400 of the program. Thus, the information processing device 100 may determine whether or not the process indicated by the SCS is suitable to be executed by the accelerator, while the source code 400 of the program is kept confidential.

As a result, a designer of the source code 400 of the program may recognize whether or not the performance of the source code 400 of the program is improved by the accelerator, while the source code 400 of the program is kept confidential. Thus, the designer of the source code 400 of the program may not take a risk that the source code 400 of the program is disclosed.

In addition, the information processing device 100 may calculate the characteristic values specific to the process indicated by the SCS, regardless of the type of the accelerator. Thus, the information processing device 100 may determine whether or not the process indicated by the SCS is suitable to be executed by the accelerator based on the characteristic values specific to the process indicated by the SCS, regardless of the type of the accelerator.

In addition, after calculating the characteristic values of the process indicated by the SCS, the information processing device 100 may generate accelerators suitable to execute the process indicated by the SCS, select an accelerator from among the multiple candidate accelerators, and use the selected accelerator. As a result, the information processing device 100 may improve the processing power of the program.

Other Example of Calculation of Operations to be Executed for Process Indicated by SCS Next, another example of the calculation of operations to be executed per unit of time for the process indicated by the SCS is described with reference to FIG. 13. For example, a process indicated by a certain basic block is called by multiple calling sources in a certain case. In this case, in the calculation of operations to be executed per unit of time for the process indicated by the SCS, it is preferable that the number of operations to be executed per unit of time for the process indicated by the basic block be weighted based on the number of times that the process indicated by the basic block has been called in the process indicated by the SCS.

FIG. 13 is an explanatory diagram illustrating another example of the calculation of the number of operations to be executed per unit of time for the process indicated by the SCS. As illustrated in FIG. 13, the information processing device 100 uses an event information table 1300 to store an LBR record included in the event information 703. In the LBR record, a certain number of past command addresses preceding the latest command address are recorded every time branch command execution occurs during the execution of the program. In the example illustrated in FIG. 13, the LBR record indicates records of up to four command addresses in each row.

The information processing device 100 references the event information table 1300 and calculates the ratio of the number of times that the process indicated by the basic block has been called in the process indicated by the SCS with respect to the total number of times that the process indicated by the basic block has been executed. Then, the information processing device 100 multiplies the number of events for execution operations in the basic block by the calculated ratio, thereby calculating the number of operations to be executed per unit of time for the process indicated by the SCS. Thus, the information processing device 100 may accurately calculate the number of operations to be executed per unit of time for the process indicated by the SCS.

Example in which Type of Specified Event is Changed

Next, an example in which the type of a specified event is changed is described with reference to FIG. 14. The examples illustrated in FIGS. 7 and 8 describe the case where an execution operation is specified as an event in advance. As indicated in the example of FIG. 14, a floating point operation or the number of execution commands may be specified as an event in advance.

Figure 14:
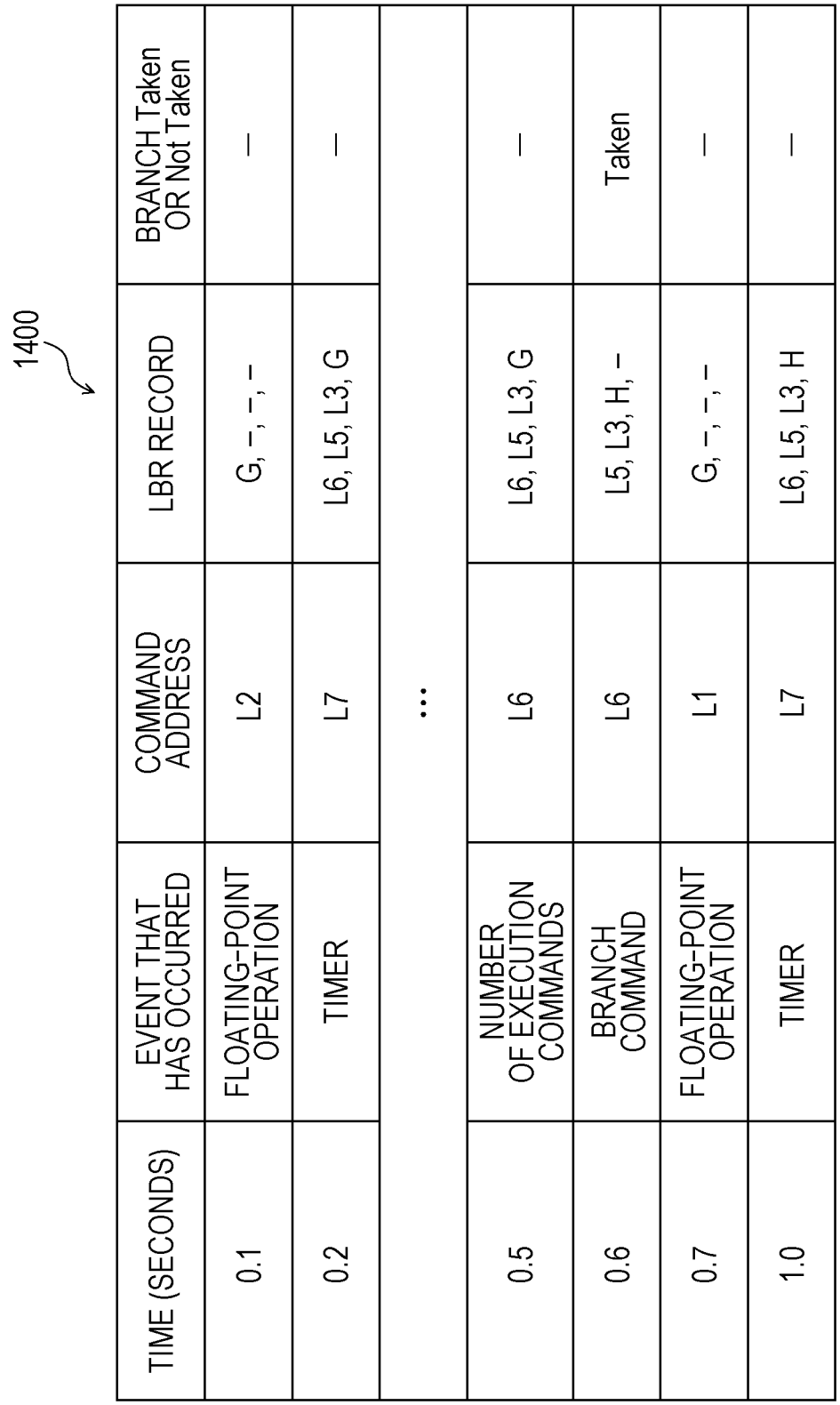
FIG. 14 is a diagram illustrating an example in which the type of a specified event is changed.

FIG. 14 is an explanatory diagram illustrating the example in which the type of the specified event is changed. If a floating point operation is specified in advance, the information processing device 100 stores an event information table 1400 illustrated in FIG. 14, for example. The information processing device 100 may calculate the number of floating point operations for each of the processes indicated by the SCSs, instead of or as well as the numbers of operations. In addition, the information processing device 100 may use, as the accelerator requirement, a requirement related to the number of floating point operations.

Thus, the information processing device 100 may determine that a process that is indicated by an SCS and causes the number of floating point operations to exceed a resource restriction of a floating point circuit included in the accelerator is not suitable to be executed by the accelerator.

If the number of execution commands is specified in advance, the information processing device 100 stores the event information table 1400 illustrated in FIG. 14. Then, the information processing device 100 may calculate the number of integer operations for each of the processes indicated by the SCSs, instead of or as well as the numbers of operations. In addition, the information processing device 100 may use, as the accelerator requirement, a requirement related to the numbers of integer operations.

Thus, the information processing device 100 may determine that a process that is indicated by an SCS and causes the number of integer operations to exceed a resource restriction of an integer operation circuit included in the accelerator or a resource restriction of random logic is not suitable to be executed by the accelerator.

Entire Process Procedure

Next, an example of a procedure for an entire process to be executed by the information processing device 100 is described with reference to FIG. 15. The entire process is achieved by the CPU 201 illustrated in FIG. 2, the network I/F 203, and a storage region of the memory 202 or a storage region of the storage medium 205, for example.

Figure 15:
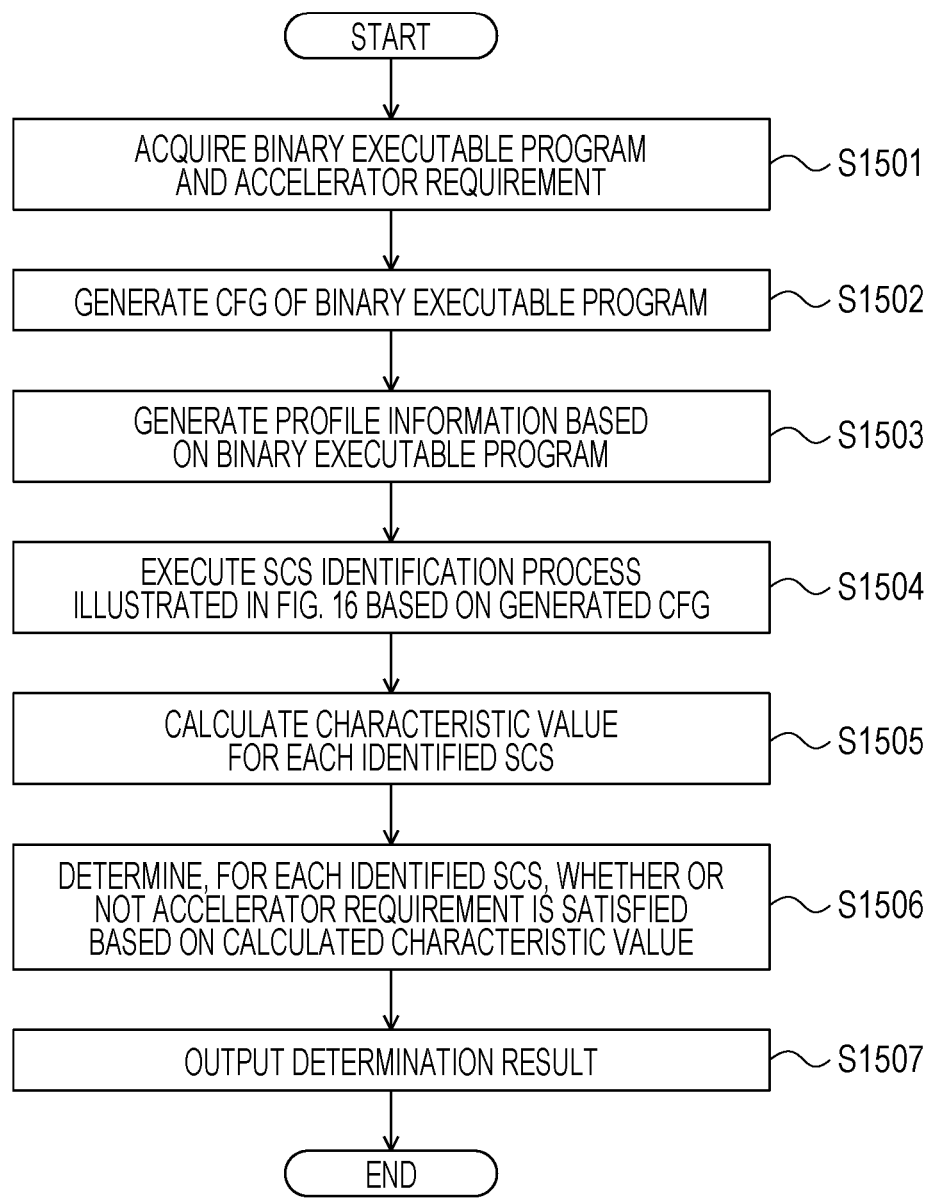
FIG. 15 is a flowchart of an example of a procedure for an entire process.

FIG. 15 is a flowchart of an example of the procedure for the entire process. As illustrated in FIG. 15, the information processing device 100 acquires the program and the accelerator requirement (in step S1501). Next, the information processing device 100 generates the CFG 500 of the program (in step S1502). Then, the information processing device 100 generates the profile information based on the program (in step S1503).

Then, the information processing device 100 executes an SCS identification process, described later with reference to FIG. 16, of identifying SCSs based on the generated CFG 500 (in step S1504). Then, the information processing device 100 calculates characteristic values for each of the identified SCSs (in step S1505). Next, the information processing device 100 determines, based on the calculated characteristic values, whether or not each of the identified SCSs satisfies the accelerator requirement (in step S1506). Then, the information processing device 100 outputs the results of the determination (in step S1507) and terminates the entire process.

Procedure for SCS Identification Process

Next, an example of the SCS identification process to be executed by the information processing device 100 is described with reference to FIG. 16. The SCS identification process is achieved by the CPU 201 illustrated in FIG. 2, the network I/F 203, and a storage region of the memory 202 or a storage region of the storage medium 205, for example.

Figure 16:
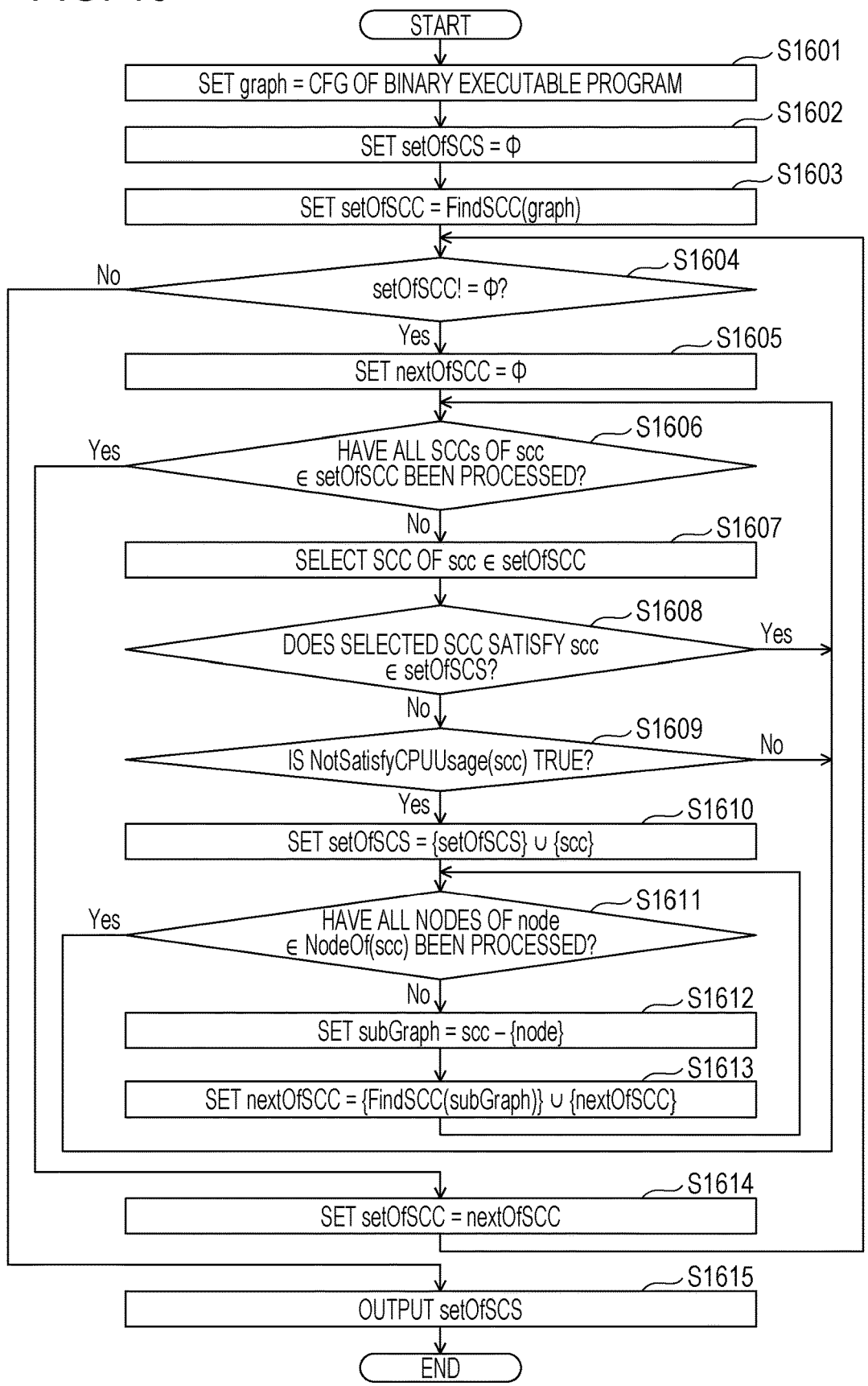
FIG. 16 is a flowchart of an example of a procedure for an SCS identification process.

FIG. 16 is a flowchart of an example of the procedure for the SCS identification process. As illustrated in FIG. 16, the information processing device 100 sets graph=the CFG 500 of the program (in step S1601). Next, the information processing device 100 sets setOfSCS=Φ (in step S1602), where Φ is an empty set. Then, the information processing device 100 sets setOfSCC=FindSCC (graph) (in step S1603). FIndSCC (graph) is a function identifying an SCC.

Next, the information processing device 100 determines whether or not setOfSCC!=Φ (in step S1604). If setOfSCC!=Φ (Yes in step S1604), the information processing device 100 causes the process to step S1605. On the other hand, if setOfSCC!≠Φ (No in step S1604), the information processing device 100 causes the process to step S1615.

The information processing device 100 sets nextOfSCC=Φ (in step S1605).

Next, the information processing device 100 determines whether or not all SCCs of scc∈setOfSCC have been processed (in step S1606). If any of the SCCs of scc∈setOfSCC has not been processed (No in step S1606), the information processing device 100 causes the process to proceed to a process of step S1607. On the other hand, if all the SCCs of scc∈setOfSCC have been processed (Yes in step S1606), the information processing device 100 causes the process to proceed to a process of step S1614.

The information processing device 100 selects an SCC OF scc∈setOfSCC (in step S1607).

Next, the information processing device 100 determines whether or not the selected SCC satisfies scc∈setOfSCS (in step S1608). If the selected SCC satisfies scc∈setOfSCS (Yes in step S1608), the information processing device 100 causes the process to proceed to the process of step S1606. On the other hand, if the selected SCC does not satisfy scc∈setOfSCS (No in step S1608), the information processing device 100 causes the process to proceed to a process of step S1609.

Next, the information processing device 100 determines whether or not NotSatisfyCPUUsage(scc) is true (in step S1609). In this case, if NotSatisfyCPUUsage(scc) is not true (No in step S1609), the information processing device 100 causes the process to proceed to the process of step S1606. On the other hand, if NotSatisfyCPUUsage(scc) is true (Yes in step S1609), the information processing device 100 causes the process to proceed to a process of step S1610.

The information processing device 100 sets setOfSCS={setOfSCS} ∪ {scc} (in step S1610).

Next, the information processing device 100 determines whether or not all nodes of node∈NodeOf(scc) have been processed (in step S1611). If all the nodes of node∈NodeOf(scc) have been processed (Yes in step S1611), the information processing device 100 causes the process to proceed to the process of step S1606. On the other hand, if any of all the nodes of node e NodeOf(scc) has not been processed (No in step S1611), the information processing device 100 causes the process to proceed to a process of step S1612.

The information processing device 100 sets subGraph=scc−{node} (in step S1612). Next, the information processing device 100 sets nextOfSCC={FindSCC(subGraph)} ∪ {nextOfSCC} (in step S1613). Then, the information processing device 100 causes the process to proceed to the process of step S1611.

The information processing device 100 sets setOfSCC=nextOfSCC (in step S1614). Then, the information processing device 100 causes the process to proceed to the process of step S1604.

The information processing device 100 outputs setOfSCS (in step S1615). Then, the information processing device 100 terminates the SCS identification process.

Example of Source Code 1700 Defining SCS Identification Process

Next, an example of a source code 1700 defining the SCS identification process illustrated in FIG. 16 is described with reference to FIG. 17.

FIG. 17 is an explanatory diagram illustrating the example of the source code 1700 defining the SCS identification process. As illustrated in FIG. 17, the source code 1700 describes a function GenerateSCS(graph). The function GenerateSCS(graph) is a function of receiving the CFG 500 of the program=graph to identify the one or more SCSs.

In a row L1, "setOfSCS=Φ" is described and indicates that an SCS set is initialized to an empty set. In a row L2, "setOfSCC=FindSCC(graph)" is described and indicates that SCCs of graph are calculated by the SCC decomposition algorithm described in the aforementioned Reference Document 1.

In a row L3, "while (setOfSCC!=ϕ)" is described and indicates that a while loop is repeated until all the SCCs are processed. In a row L4, "nextOfSCC=ϕ)" is described and indicates that a variable for setting an SCC set to be processed by the next foreach loop is initialized.

In a row L5, "foreach (scc∈setOfSCC)" is described and indicates that SCCs of the SCC set are processed in order. In a row L6, "if (scc∈setOfSCS) continue" is described and indicates that a process related to processed scc is skipped.

In a row L7, "if (NotSatisfyCPUUsage(scc)) continue" is described and indicates that a process related to scc that does not satisfy a predetermined requirement is skipped. The predetermined requirement is, for example, a requirement in which the CPU utilization is equal to or higher than a certain value. In a row L8, "setOfSCS=setOfSCS ∪ {scc}" is described and indicates that scc is added to the SCS set.

In a row L9, "foreach (node∈NodeOf(scc))" is described and indicates that nodes included in scc are repeatedly processed. In a row L10, "subGraph=scc−{node}" is described and indicates that a partial graph obtained by removing node from scc is set to subGraph.

In a row L11, "nextOfSCC=FindSCC(subGraph) ∪ nextOfSCC" is described and indicates that an SCC is calculated. In a row L14, "setOfSCC=nextOfSCC" is described and indicates that the next SCC set is set to the current SCC set. In a row L16, "return setOfSCS" is described and indicates that the SCS set is returned as a result.

As described above, the information processing device 100 may identify one or more SCCs included in a CFG of a program. The information processing device 100 may calculate characteristic values indicating characteristics of processes indicated by the identified one or more SCSs based on profile information indicating characteristics of the processes indicated by the one or more nodes included in the CFG. The information processing device 100 may determine whether or not each of the processes indicated by the one or more SCSs is suitable to be executed by the accelerator, based on the calculated characteristic values of the one or more SCSs and the requirement set for the accelerator. Thus, the information processing device 100 may determine whether or not each of the processes indicated by the one or more SCSs is suitable to be executed by the accelerator within a relatively short time period and easily determine whether or not any of the processes is to be executed by the accelerator.

The information processing device 100 may calculate a first characteristic value that is larger as the number of operations to be executed per unit of time for a process indicated by an SCS is larger or the amount of data to be accessed per unit of time for the process indicated by the SCS is smaller. If the calculated first characteristic value exceeds the first threshold set for the accelerator, the information processing device 100 may determine that the process indicated by the SCS is suitable to be executed by the accelerator. Thus, the information processing device 100 may determine that a process that enables the processing power of the program to be improved by a certain value or more when the process is executed by the accelerator is suitable to be executed by the accelerator.

The information processing device 100 may calculate a second characteristic value indicating the number of operations for a process indicated by an SCS. If the calculated second characteristic value is lower than the second threshold set for the accelerator, the information processing device 100 may determine that the process indicated by the SCS is suitable to be executed by the accelerator. Thus, the information processing device 100 may determine that a process that is able to be executed with the processing power of the accelerator is suitable to be executed by the accelerator.

The information processing device 100 may calculate the second characteristic value based on a branching probability of a branch process included in the process indicated by the SCS. Thus, the information processing device 100 may accurately calculate the number of operations for the process indicated by the SCS and accurately calculate the second characteristic value.

The information processing device 100 may obtain the second characteristic value by dividing the number of operations to be executed per unit of time for the process indicated by the SCS by the frequency at which the process indicated by the SCS is executed per unit of time. Thus, even if the SCS includes another SCS, the information processing device 100 may accurately calculate the second characteristic value.

The information processing device 100 may calculate a difference by subtracting, from the number of operations to be executed per unit of time for a process indicated by a certain SCS, the number of operations to be executed per unit of time for a process indicated by another SCS included in the certain SCS. The information processing device 100 may divide the calculated difference by the number of operations for a process indicated by a partial graph obtained by removing the other SCS from the certain SCS, thereby calculating the frequency at which the process indicated by the certain SCS is executed per unit of time. Thus, if the SCS includes the other SCS, the information processing device 100 may accurately calculate the frequency at which the process indicated by the SCS is executed per unit of time, and the information processing device 100 may accurately calculate the second characteristic value.

The information processing device 100 may calculate the number of operations for the process indicated by the partial graph based on a branching probability of a branch process included in the process indicated by the partial graph. Thus, the information processing device 100 may accurately calculate the number of operations for the process indicated by the partial graph and accurately calculate the second characteristic value.

The information processing device 100 may calculate the number of operations to be executed per unit of time for the process indicated by the SCS, based on the number of times that a process indicated by one or more nodes included in the SCS has been called in the process indicated by the SCS. Thus, the information processing device 100 may accurately calculate the number of operations to be executed per unit of time for the process indicated by the SCS.

The information processing device 100 may calculate a third characteristic value indicating a time period for using the arithmetic device per unit of time for the process indicated by the SCS. If the calculated third characteristic value exceeds the third threshold set for the accelerator, the information processing device 100 may determine that the process indicated by the SCS is suitable to be executed by the accelerator. Thus, the information processing device 100 may determine that a process that enables the processing load of the CPU 201 to be reduced by a certain value or more when the process is executed by the accelerator is suitable to be executed by the accelerator.

The information processing device 100 may identify one or more SCSs indicating processes for which the numbers of operations exceed a predetermined value. Thus, the information processing device 100 may not identify an SCS indicating a process for which the numbers of operations does not exceed the predetermined value and that is not relatively suitable to be executed by the accelerator, and the information processing device 100 may reduce the processing load.

The information processing method described in the embodiment may be achieved by causing a computer such as a personal computer or a workstation to execute a program prepared in advance. The information processing program described in the embodiment is stored in a computer-readable storage medium such as a hard disk, a flexible disk, a CD-ROM, an MO, or a DVD. The information processing program described in the embodiment is read by the computer from the storage medium and executed by the computer. The information processing program described in the embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
identify each of one or more strongly connected graphs included in a control flow graph of a program,
calculate a first characteristic value indicating a characteristic of a first process indicated by the identified strongly connected graph, based on profile information indicating a characteristic of a second process indicated by each of one or more nodes included in the control flow graph,
determine, based on the calculated first characteristic value of the first process and a requirement set for an accelerator, whether or not the first process is executable by the accelerator, and
calculate a second characteristic value that indicates a number of operations of the first process, and when the calculated second characteristic value is smaller than a first threshold set for the accelerator, the processor determines that the first process is executable by the accelerator,
wherein the second characteristic value is obtained by dividing a number of operations, that are executed per unit of time by the first process, by a frequency at which the first process is executed per unit of time.

2. The information processing device according to claim 1, wherein:
the first characteristic value increases:
with decrease in an amount of data that are accessed per unit of time by the first process; and
when the calculated first characteristic value exceeds the first threshold set for the accelerator, the processor determines that the first process is executable by the accelerator.

3. The information processing device according to claim 1, wherein
the number of operations is obtained by:
applying a first weight obtained based on a branching probability of a branch process included in the first process indicated by the strongly connected graph, to a number of operations of the second process indicated by each of the one or more nodes included in the strongly connected graph, and
summing the numbers of operations of the second processes to which the first weights have been applied.

4. The information processing device according to claim 1, wherein
the frequency is obtained by dividing a difference, which is obtained by subtracting a number of operations that are executed per unit of time by a third process indicated by another strongly connected graph included in the strongly connected graph from a number of operations that are executed per unit of time by the first process, by a number of operations of a fourth process indicated by a partial graph obtained by removing the another strongly connected graph from the strongly connected graph.

5. The information processing device according to claim 4, wherein
the number of operations of the fourth process indicated by the partial graph is obtained by:
applying a second weight obtained from a branching probability of a branch process included in the fourth process indicated by the partial graph, to a number of operations of a fifth process indicated by each of one or more nodes included in the partial graph, and
summing the numbers of operations of the fifth process to which the second weights have been applied.

6. The information processing device according to any of claim 1, wherein
the number of operations that are executed per unit of time by the first process is obtained by:
applying a weight obtained based on a number of times that a third process indicated by each of one or more nodes included in the strongly connected graph has been called in the first process, to a number of operations of the third process, and
summing the numbers of operations of the third process to which the weights have been applied.

7. The information processing device according to any of claim 1, wherein:
the processor calculates a second characteristic value indicating a length of time for which an arithmetic device is used per unit of time by the first process; and
when the calculated second characteristic value exceeds a second threshold set for the accelerator, the processor determines that the first process is executable by the accelerator.

8. The information processing device according to claim 1, wherein
the processor identifies each of the one or more strongly connected graphs included in the control flow graph so that the identified strongly connected graph indicates the first process whose number of operations exceeds a predetermined value.

9. A method comprising:
identifying each of one or more strongly connected graphs included in a control flow graph of a program;
calculating a first characteristic value indicating a characteristic of a first process indicated by the identified strongly connected graph, based on profile information indicating a characteristic of a second process indicated by each of one or more nodes included in the control flow graph;
determining, based on the calculated characteristic value of the first process and a requirement set for an accelerator, whether or not the first process is executable by the accelerator; and
calculating a second characteristic value that indicates a number of operations of the first process, and when the calculated second characteristic value is smaller than a first threshold set for the accelerator, the processor determines that the first process is executable by the accelerator,
wherein the second characteristic value is obtained by dividing a number of operations, that are executed per unit of time by the first process, by a frequency at which the first process is executed per unit of time.

10. A non-transitory, computer-readable recording medium having stored therein a program for causing a computer to execute a process:
identifying each of one or more strongly connected graphs included in a control flow graph of a program;
calculating a characteristic value indicating a characteristic of a first process indicated by the identified strongly connected graph, based on profile information indicating a characteristic of a second process indicated by each of one or more nodes included in the control flow graph;

determining, based on the calculated characteristic value of the first process and a requirement set for an accelerator, whether or not the first process is executable by the accelerator; and calculating a second characteristic value that indicates a number of operations of the first process, and when the calculated second characteristic value is smaller than a first threshold set for the accelerator, the processor determines that the first process is executable by the accelerator, wherein the second characteristic value is obtained by dividing a number of operations, that are executed per unit of time by the first process, by a frequency at which the first process is executed per unit of time.

11. An information processing device comprising:
a memory; and
a processor coupled to the memory and configured to:
identify each of one or more strongly connected graphs included in a control flow graph that indicates a series of processes defined in a program, each of the one more strongly connected graphs being a subset of the control flow graph in which a directed path exists between each pair of nodes, calculate a first characteristic value indicating a characteristic of a process indicated by the identified strongly connected graph, based on profile information indicating a characteristic of processes associated with each of one or more nodes included in the control flow graph, calculate a second characteristic value that indicates a number of operations of the first process, and when the calculated second characteristic value is smaller than a first threshold set for the accelerator, the processor determines that the first process is executable by the accelerator, and execute the process using the accelerator based on a comparison of the second characteristic value to a first threshold set for the accelerator, wherein the second characteristic value is obtained by dividing a number of operations, that are executed per unit of time by the first process, by a frequency at which the first process is executed per unit of time.

12. An information processing device according to claim 11, wherein
the second characteristic value is a number of operations for the process indicated by the strongly connected graph, the second characteristic value being further calculated by weighting and summing, based on a branching probability of a branch process included in the process, the numbers of operations for processes indicated by one or more nodes included in the strongly connected graph; and the processor further executes the process using the accelerator when the number of operations is less than the first threshold.

* * * * *